United States Patent
Okamoto et al.

(10) Patent No.: US 9,671,522 B2
(45) Date of Patent: Jun. 6, 2017

(54) MULTI-OPTICAL AXIS PHOTOELECTRIC SENSOR SYSTEM

(71) Applicant: OMRON Corporation, Kyoto-shi, Kyoto (JP)

(72) Inventors: Kazunori Okamoto, Kusatsu (JP); Minoru Hashimoto, Ritto (JP); Keisaku Kikuchi, Kyoto (JP); Kazunori Osako, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/797,209

(22) Filed: Jul. 13, 2015

(65) Prior Publication Data

US 2016/0011330 A1 Jan. 14, 2016

(30) Foreign Application Priority Data

Jul. 14, 2014 (JP) .................... 2014-144335

(51) Int. Cl.
*G06M 7/00* (2006.01)
*G01V 8/20* (2006.01)
*F16P 3/14* (2006.01)

(52) U.S. Cl.
CPC ............... *G01V 8/20* (2013.01); *F16P 3/144* (2013.01)

(58) Field of Classification Search
CPC .................... F16P 3/144; G01N 8/20
See application file for complete search history.

(56) References Cited

U.S. PATENT DOCUMENTS

2003/0164447 A1* 9/2003 Kudo .................. F16P 3/144
  250/221
2004/0124341 A1* 7/2004 Parstorfer .............. G01V 8/20
  250/221

FOREIGN PATENT DOCUMENTS

JP  H02-271199 A  11/1990
JP  2002-296361 A  10/2002
JP  4481549 B2  3/2010

* cited by examiner

*Primary Examiner* — Thanh Luu
(74) *Attorney, Agent, or Firm* — Mots Law, PLLC

(57) ABSTRACT

A detection processing unit determines, in a detection area including optical axes formed between emitter elements and receiver elements, whether each optical axis is in an interrupted state after optical axis selection corresponding to one scan, and outputs a detection signal based on the determination result. When at least one of the optical axes is constantly interrupted by an object movable within the detection area, the detection processing unit outputs the detection signal upon determining that the number of optical axes in an interrupted state is greater than a preset maximum optical axis number, and also outputs the detection signal upon determining that the number of optical axes in an interrupted state is smaller than a preset minimum optical axis number.

8 Claims, 18 Drawing Sheets

1st scan

Teaching

●...Floating activated area
Floating optical axis number: 2
Excluded optical axis number: 0

2nd scan

Teaching

●...Floating activated area
Floating optical axis number: 3
Excluded optical axis number: 1

3rd scan

Teaching

●...Floating activated area
Floating optical axis number: 3
Excluded optical axis number: 1

FIG. 4
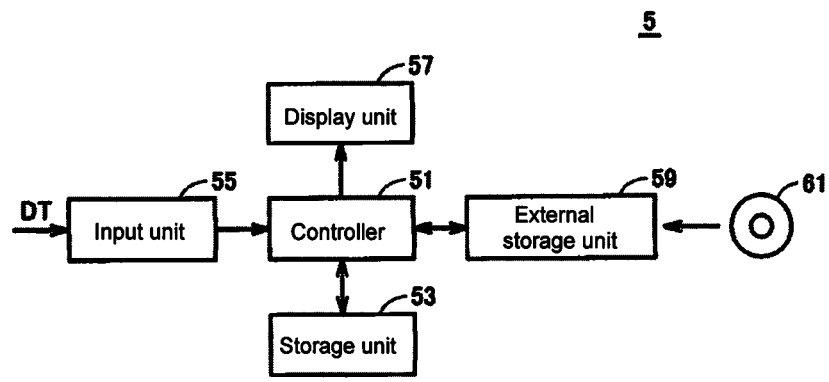
FIG. 5
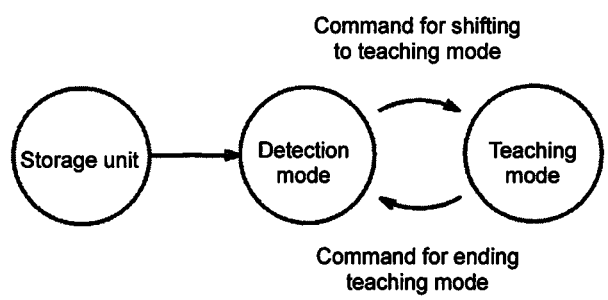
FIG. 6A    FIG. 6B
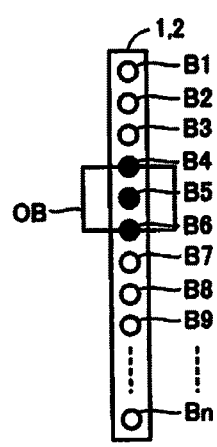
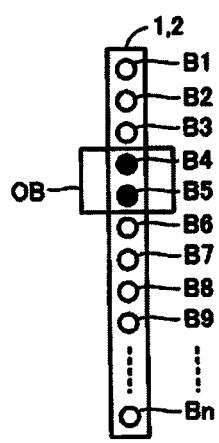

MULTI-OPTICAL AXIS PHOTOELECTRIC SENSOR SYSTEM

FIELD

The present invention relates to a multi-optical axis photoelectric sensor system, and more particularly, to a multi-optical axis photoelectric sensor system with floating blanking of a multi-optical axis photoelectric sensor.

BACKGROUND

A typical multi-optical axis photoelectric sensor includes an emitter unit, which includes a plurality of emitter elements aligned linearly, and a receiver unit, which includes a plurality of receiver elements aligned linearly in one-to-one correspondence to the emitter elements. The emitter elements and the receiver elements are arranged to face each other in one-to-one correspondence and define a detection area formed by a plurality of optical axes.

The emitter unit sequentially lights their emitter elements. The receiver unit determines the amount of light received by each of the receiver elements in synchronization with the lighting operation of the emitter elements. The emitter unit sequentially detects the interrupted state of each of the optical axes of the multi-optical axis photoelectric sensor. The receiver unit determines whether an object is in the detection area based on the detection result for each optical axis, and outputs a signal indicating the determination result. The emitter unit and the receiver unit are connected with a communication line to allow synchronization between the emitter and receiver units. The emitter unit and the receiver unit may be synchronized with each other by optical communication between them.

The multi-optical axis photoelectric sensor is installed, for example, on a production site to achieve the safety of workers. For example, when detecting an interrupted state of any of the optical axes in the detection area, the multi-optical axis photoelectric sensor stops the operation of the manufacturing equipment. However, the manufacturing system may be used in an environment in which some of the optical axes in the detection area of the multi-optical axis photoelectric sensor are constantly interrupted by a specific object, such as a workpiece. For such an application, the multi-optical axis photoelectric sensor has blanking, which can nullify the optical axes that are interrupted by a specific object. Such blanking may either be fixed blanking, which is used for a light interrupting object that is stationary within the detection area, or floating blanking, which is used for a light interrupting object that is movable within the detection area.

As described above, the multi-optical axis photoelectric sensor provides safety function by immediately stopping the operation of the manufacturing equipment upon detecting any optical axis interrupted in the detection area, independently of the number of interrupted optical axes. In contrast, the sensor with blanking stops the operation of the manufacturing equipment upon detecting that any of the optical axes excluding the optical axes satisfying predetermined conditions is interrupted in the detection area. The optical axes satisfying the predetermined conditions can be set freely by the user in accordance with the size and the position of the light interrupting object in the detection area. More specifically, the sensor with fixed blanking allows the user to select optical axes to be nullified in the detection area. The sensor with floating blanking allows the user to determine the number of optical axes to be nullified.

For example, Japanese Unexamined Patent Application Publication No. 2-271199 (Patent Literature 1) describes a photoelectric safety device for a machine tool. This safety device scans all the optical axes in a setup mode and stores optical axes for which light interruption has been detected. When detecting light interruption of any of the optical axes excluding the optical axes that have been stored in subsequent scanning performed in an operational mode, the safety device determines that an object other than a preset light interrupting object has entered a dangerous area, and outputs a stop signal to the machine tool.

Another multi-optical axis safety device with floating blanking described in Japanese Patent No. 4481549 (Patent Literature 2) sets a floating blanking area as a part of the detection area. This safety device implements floating blanking in the floating blanking area and implements normal safety function in the other area. The safety device described in Patent Literature 2 sets the floating blanking area through teaching. More specifically, a light interrupting object is placed in an area to be set as the floating blanking area. While the object is interrupting light, the teaching button is pushed to set the floating blanking area. This sets the other area without the light interrupting object as an area in which normal operation is to be performed.

CITATION LIST

Patent Literature

Patent Literature 1: Japanese Unexamined Patent Application Publication No. 2-271199

Patent Literature 2: Japanese Patent No. 4481549

SUMMARY

Technical Problem

To allow such floating blanking to function correctly, the number of optical axes to be nullified needs to be optimized for an actual application. However, an object in the detection area may move irregularly due to vibrations of the machine or other factors in an actual application. When such irregular changes in the position of the object change the number of optical axes interrupted by the object, the number of optical axes preset to be nullified may differ from the number of optical axes actually interrupted by the object. More specifically, an optical axis to be in a light-entering state may be in an interrupted state or an optical axis to be in an interrupted state may be in a light-entering state. As a result, the multi-optical axis photoelectric sensor may implement normal safety function and stop the machine unexpectedly. This can degrade the productivity at the production site.

Another multi-optical axis photoelectric sensor may have blanking monitoring to constantly monitor the presence of a light interrupting object within the detection area. With blanking monitoring, an abnormality may be detected in blanking when a light interrupting object moves out of the detection area or becomes smaller in the detection area during use of blanking. Upon detecting such an abnormality, the sensor stops the machine forcibly or deactivates the blanking to activate the entire detection area. When an optical axis to be in an interrupted state is in a light-entering state due to irregular changes in the position of the object as described above, this blanking monitoring may stop the machine unexpectedly.

To prevent malfunctioning of such floating blanking and blanking monitoring, the setting values for floating blanking and blanking monitoring need to be correctly optimized for actual applications. The techniques described in Patent Literature 1 and 2 simply set the areas to be nullified but do not include optimization for actual applications described above.

Although multi-optical axis photoelectric sensors known in the art may obtain correct setting values through calculations or through trial and error using an actual machine, the calculations involve complicated processing that uses variables representing the minimum detection sensitivity of the multi-optical axis photoelectric sensor and the size of a light interrupting object. The setting for such calculations takes much time. The trial and error approach also uses a large number of manhours in narrowing the setting values.

The present invention is directed to a multi-optical axis photoelectric sensor system with floating blanking that allows correct and prompt settings in blanking for actual applications.

Solution to Problem

A multi-optical axis photoelectric sensor system according to one aspect of the present invention includes an emitter unit, a receiver unit, and a detection processing unit. The emitter unit includes a plurality of emitter elements that are aligned linearly. The receiver unit includes a plurality of receiver elements that are arranged to face the respective emitter elements. The detection processing unit determines, in a detection area including a plurality of optical axes formed between the plurality of emitter elements and the plurality of receiver elements, whether each of the optical axes is in an interrupted state after optical axis selection corresponding to one scan, and outputs a detection signal based on a result of the determination. When at least one of the plurality of optical axes is constantly interrupted by an object movable within the detection area, the detection processing unit outputs the detection signal upon determining that the number of optical axes in an interrupted state is greater than a preset maximum optical axis number. The detection processing unit also outputs the detection signal upon determining that the number of optical axes in an interrupted state is smaller than a preset minimum optical axis number.

In one or more embodiments, the multi-optical axis photoelectric sensor system further includes a teaching processing unit. The teaching processing unit sets the maximum optical axis number and the minimum optical axis number through teaching performed using the object. The teaching processing unit obtains the number of optical axes interrupted by the object after optical axis selection corresponding to one scan, and sets the maximum optical axis number and the minimum optical axis number based on a result of comparison between the numbers of interrupted optical axes obtained in the respective scans.

In one or more embodiments, the teaching processing unit sets the minimum optical axis number as a smallest value of the numbers of interrupted optical axes obtained in the respective scans or as a value obtained by subtracting a predetermined optical axis number from the smallest value.

In one or more embodiments, the teaching processing unit sets the maximum optical axis number as a largest value of the numbers of interrupted optical axes obtained in the respective scans or as a value obtained by adding a predetermined optical axis number to the largest value.

In one or more embodiments, the teaching processing unit sets the maximum optical axis number as a value obtained by adding a predetermined optical axis number to a smallest value of the numbers of interrupted optical axes obtained in the respective scans.

In one or more embodiments, the teaching processing unit sets the minimum optical axis number as a value obtained by subtracting a predetermined optical axis number from a largest value of the numbers of interrupted optical axes obtained in the respective scans.

In one or more embodiments, the teaching processing unit is arranged in at least one of the emitter unit and the receiver unit.

In one or more embodiments, the detection processing unit is arranged in at least one of the emitter unit and the receiver unit.

Advantageous Effect

The multi-optical axis photoelectric sensor system according to embodiments of the present invention has floating blanking that nullifies one or more optical axes interrupted by a specific object that is movable in a detection area, and sets a maximum optical axis number as a setting value for floating blanking and a minimum optical axis number as a setting value for blanking monitoring through teaching performed using the specific object. This optimizes the setting values for floating blanking and blanking monitoring correctly and promptly for an actual application. The multi-optical axis photoelectric sensor system can thus readily achieve both productivity and safety.

BRIEF DESCRIPTION OF THE DRAWINGS

FIG. 4 is a block diagram of a personal computer shown in FIG. 3.

FIG. 5 is a schematic diagram describing operational modes used in the multi-optical axis photoelectric sensor system and the relationship between these modes.

FIGS. 6A and 6B are schematic diagrams each showing a detection area viewed in the direction of the optical axes.

DETAILED DESCRIPTION

Figure 1:
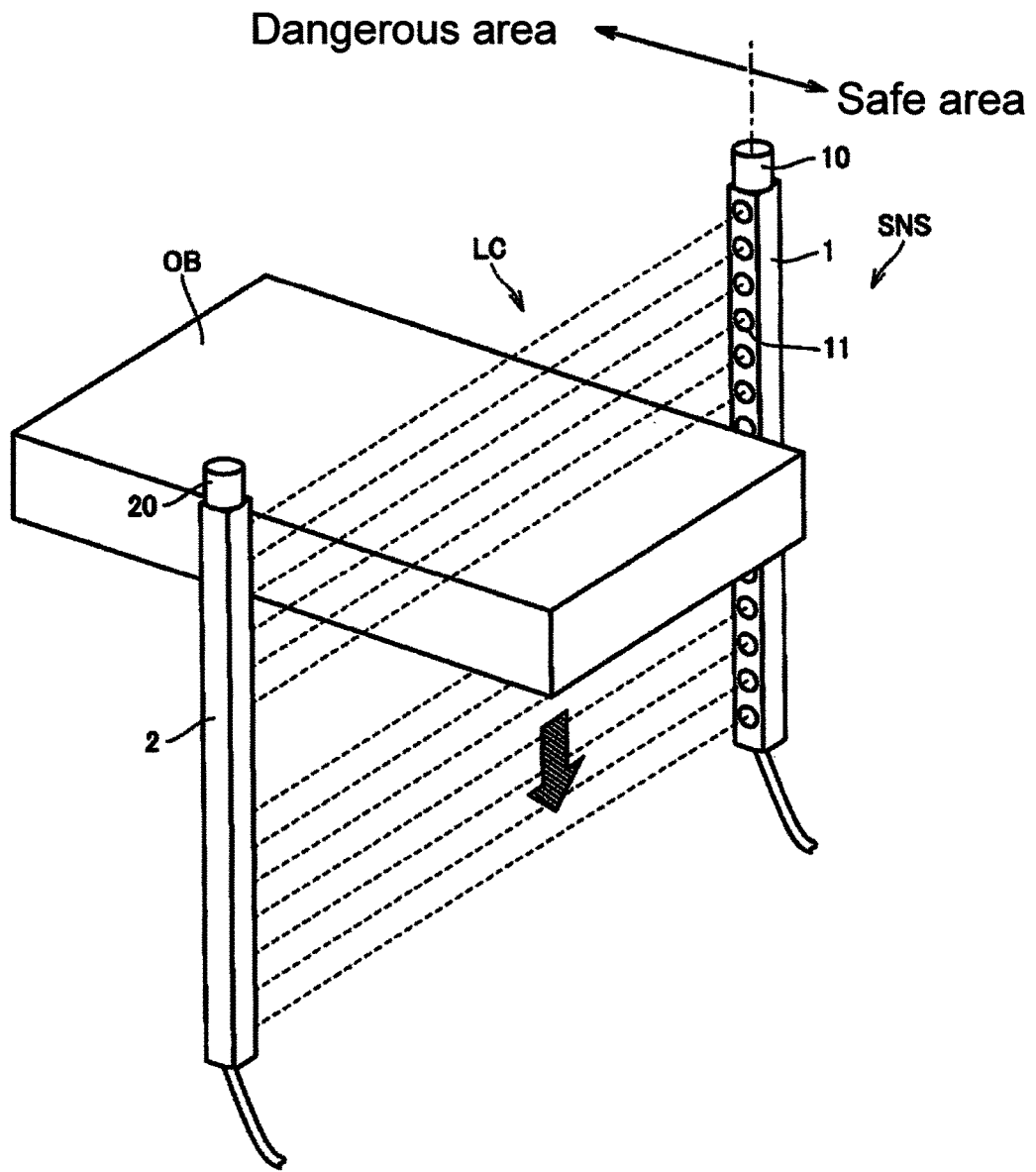
FIG. 1 is a schematic diagram showing the structure of a multi-optical axis photoelectric sensor system according to an embodiment.

Embodiments of the present invention will now be described in detail with reference to the drawings. In the drawings, the same reference numerals indicate the same or the corresponding components. In this specification, a dotted line indicating the direction in which a light beam travels or indicating the light beam refers to an optical axis unless otherwise specified.

FIG. 1 is a schematic diagram showing the structure of a multi-optical axis photoelectric sensor system according to an embodiment. As shown in FIG. 1, the multi-optical axis photoelectric sensor system according to the embodiment includes a sensor device, which is specifically a multi-optical axis photoelectric sensor SNS.

The multi-optical axis photoelectric sensor SNS includes an emitter unit 1 and a receiver unit 2. The emitter unit 1 includes a plurality of emitter elements 11 (luminous elements). The receiver unit 2 includes a plurality of receiver elements 21 facing the emitter elements 11 (refer to FIG. 3). The emitter elements 11 and the receiver elements 21 are aligned with each other in one-to-one correspondence and define a two-dimensional detection area LC formed by a plurality of optical axes.

In the example shown in FIG. 1, the area in front of the detection area LC is a safe area, and the area behind the detection area LC is a dangerous area. In the dangerous area, a machine such as a manufacturing system (not shown) is installed. The multi-optical axis photoelectric sensor SNS outputs a detection signal to a power supply circuit (not shown) of the machine. When the detection area LC is not interrupted, the multi-optical axis photoelectric sensor SNS outputs a signal indicating a non-detected state. When the detection area LC is at least partially interrupted, the multi-optical axis photoelectric sensor SNS stops outputting a signal. This switches the detection signal from a non-detected state to a detected state. In response to such switching to a detected state, the power supply circuit of the machine stops the operation of the machine.

In response to a signal indicating a detected state from the multi-optical axis photoelectric sensor SNS, the power supply circuit of the machine stops supplying power to the machine. This places the machine in safety. The signal indicating a detected state is used as a stop signal. In response to a signal indicating a detected state, the machine may stop operating its dangerous portions or may slow the operation speed of such dangerous portions, instead of stopping power supply in the entire machine.

In the present embodiment, some of the optical axes in the detection area LC are constantly interrupted by a specific object OB. The object OB may be a part of the machine installed in the dangerous area. As indicated by the arrow in the figure, the objet OB moves in the detection area LC. The multi-optical axis photoelectric sensor SNS can use floating blanking to nullify optical axes that are temporarily interrupted by the moving object OB (FIG. 1). This structure switches the detection signal of the multi-optical axis photoelectric sensor SNS from a non-detected state to a detected state when detecting interruption of any of the optical axes excluding such optical axes interrupted by the moving object OB.

Indicator lamps 10 and 20, which can provide information about floating blanking, can be installed on the emitter unit 1 and the receiver unit 2. The indicator lamps 10 and 20 illuminate during use of floating blanking. When an abnormality occurs, the indicator lamps 10 and 20 blink to indicate the abnormality. An abnormality occurs when, for example, an object (e.g., a human body) enters the detection area LC excluding an area in which floating blanking is activated, or when a part of the floating activated area (or the entire area) is in a light-entering state due to, for example, changes in the position of the object OB.

The indicator lamps 10 and 20 also illuminate during teaching. When an abnormality occurs during teaching, the indicator lamps 10 and 20 blink to indicate the abnormality. When the teaching is complete, the indicator lamps 10 and 20 are turned off to indicate the completion of the teaching.

Figure 2:
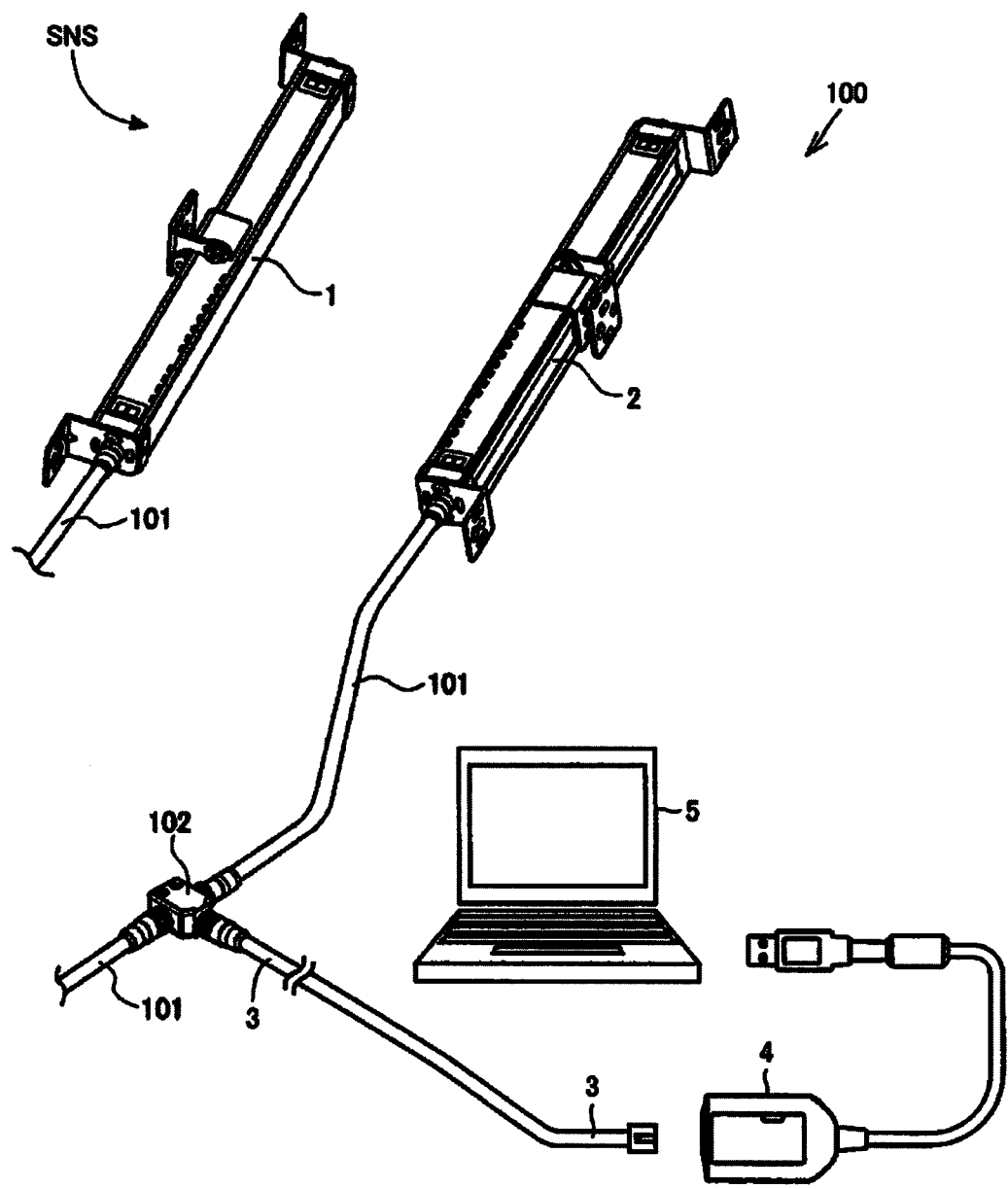
FIG. 2 is a diagram showing the appearance of the multi-optical axis photoelectric sensor system according to the embodiment.

FIG. 2 is a diagram showing the appearance of the multi-optical axis photoelectric sensor system according to the embodiment. As shown in FIG. 2, the multi-optical axis photoelectric sensor SNS includes the emitter unit 1, the receiver unit 2, and a communicator unit 4. The multi-optical axis photoelectric sensor system 100 includes the multi-optical axis photoelectric sensor SNS and a personal computer 5.

The multi-optical axis photoelectric sensor SNS includes the emitter unit 1, the receiver unit 2, and a communication cable 101. The emitter unit 1 and the receiver unit 2 are connected to each other with the communication cable 101. The communication cable 101 is connected to the communicator unit 4 via a branch connector 102 and a dedicated cord 3. The communicator unit 4 is connected to the branch connector 102 and the personal computer 5.

Figure 3:
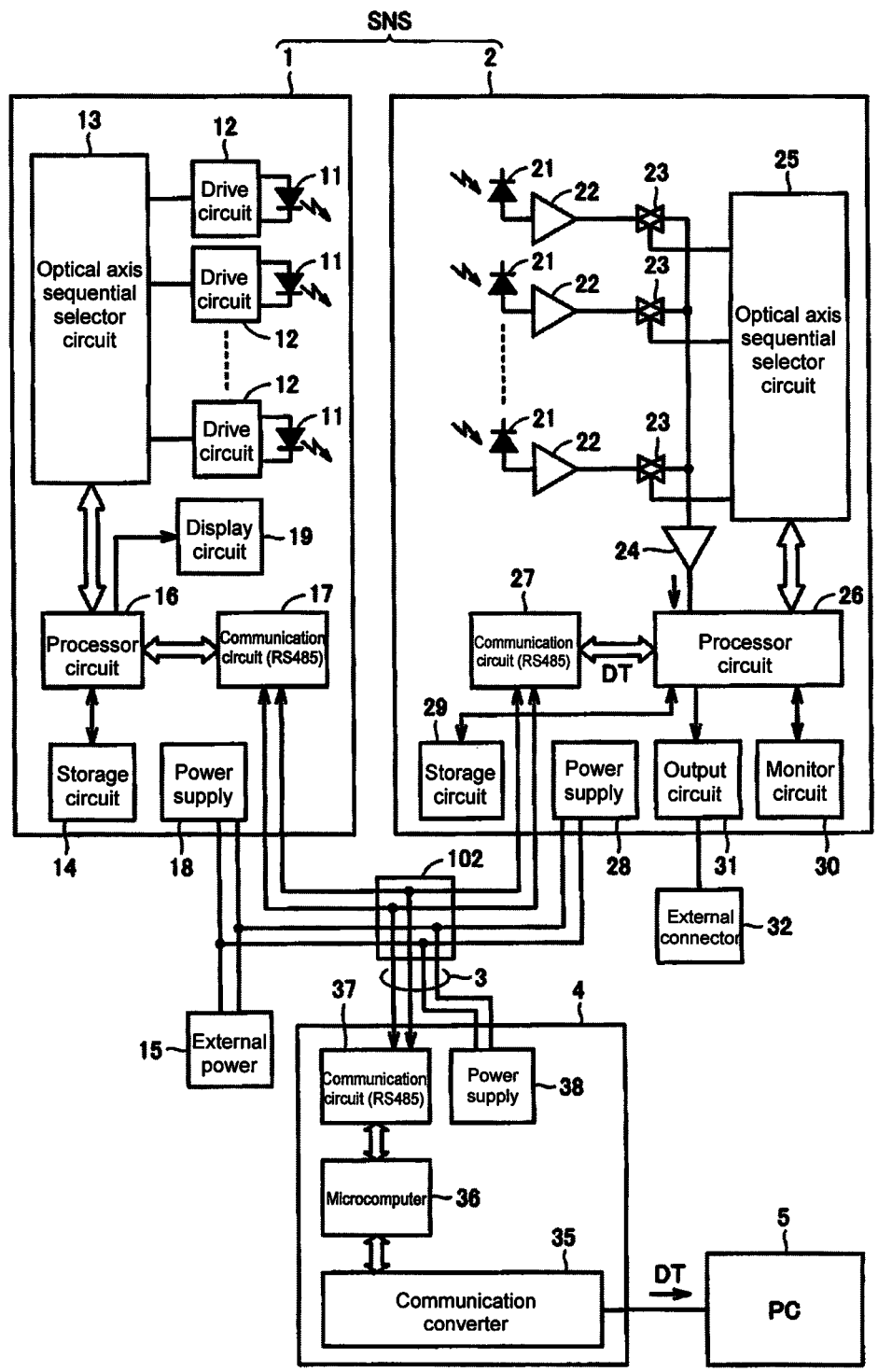
FIG. 3 is a block diagram of a multi-optical axis photoelectric sensor shown in FIG. 2.

FIG. 3 is a block diagram of the multi-optical axis photoelectric sensor system shown in FIG. 2. As shown in FIG. 3, the emitter unit 1 includes a plurality of emitter elements 11. The emitter unit 1 further includes drive circuits 12 for separately driving the emitter elements 11, an optical axis sequential selector circuit 13, a processor circuit 16, a communication circuit 17, a power supply 18, a display circuit 19, and a storage circuit 14.

The receiver unit 2 includes a plurality of receiver elements 21, which are arranged one-to-one to the plurality of emitter elements 11. The receiver unit 2 further includes amplifiers 22 and switches 23, which are arranged one-to-one to the receiver elements 21, an optical axis sequential selector circuit 25, a processor circuit 26, an amplifier 24 for amplifying an input into the processor circuit 26, a communication circuit 27, a power supply 28, a storage circuit 29, a monitor circuit 30, and an output circuit 31.

The optical axis sequential selector circuit 13 sequentially connects the drive circuit 12 for each emitter element 11 to the processor circuit 16. The optical axis sequential selector circuit 25 sequentially connects the amplifier 22 and the switch 23 corresponding to each receiver element 21 to the processor circuit 26.

Each of the processor circuits 16 and 26 is a microcomputer including a central processing unit (CPU) and a memory. The processor circuits 16 and 26 compare the amount of received light at predetermined timing with a predetermined threshold to determine whether each optical axis is in a light-entering state or an interrupted state. The processor circuits 16 and 26 combine the determination results for these optical axes every after optical axis selection corresponding to one cycle (one scan), and determine the occurrence of light interruption of the entire detection area LC. Under the floating blanking being activated, the determination results for light interruption of the optical axes interrupted by the object OB are nullified.

The communication circuits 17 and 27 are communication interfaces complying with RS-485. The communication circuits 17 and 27 control communication of signals between the emitter unit 1 and the receiver unit 2.

The storage circuits 14 and 29 each store programs and parameters used for the processing performed by the communication circuits 16 and 26 arranged in the respective units. The storage circuits 14 and 29 include areas for storing data obtained in teaching described below.

With an external connector terminal 32, the output circuit 31 is connected to a switch mechanism (not shown) incorporated in the power supply circuit for the machine installed in the dangerous area. When an output signal from the output circuit 31 indicates a non-detected state, the switch mechanism is closed to supply power to the machine installed in the dangerous area. When an output signal from the output circuit 31 indicates a detected state, the switch mechanism is open to stop the machine. The monitor circuit 30 controls lighting of the indicator lamps 10 and 20.

The power supplies 18 and 28 receive power from a common external power supply 15 (direct current power supply), and each supply power to the corresponding one of the emitter unit 1 and the receiver unit 2. The display circuit 19 includes, for example, a plurality of seven-segment light emitting diodes (LEDs). The display circuit 19 displays numerals of multiple digits and character strings of alphabet letters. The display circuit 19 may be arranged in the receiver unit 2, either instead of being arranged in the emitter unit 1 or in addition to being arranged in the emitter unit 1.

The branch connector 102 branches a communication line and a power line arranged between the emitter unit 1 and the receiver unit 2. The dedicated cord 3 contains the branched communication line or power line. The dedicated cord 3 is connected to the communicator unit 4. The communicator unit 4 is connected to the personal computer (PC in FIG. 3) 5.

The communicator unit 4 includes a microcomputer 36, a communication circuit 37, a power supply 38, and a communication converter 35. The communication circuit 37 is an interface complying with RS-485. The power supply 38 receives power from the external power supply 15 via the branch connector 102, and supplies power to the components of the communicator unit 4. The communication converter 35 serially converts a signal complying with RS-485, and outputs the resulting signal complying with, for example, RS-232C or USB (Universal Serial Bus).

The optical axis sequential selector circuit 13 and the optical axis sequential selector circuit 25 are synchronized with each other to allow the emitter elements 11 to illuminate sequentially, and allow the receiver elements 21 to sequentially output light receiving signals. The processor circuits 16 and 26 use the communication circuits 17 and 27 to synchronize signals for controlling the operation of the emitter elements 11 and the receiver elements 21.

As described above, the emitter unit 1 and the receiver unit 2 are synchronized through communication performed with the communication cable 101. Alternatively, the emitter unit 1 and the receiver unit 2 may be synchronized with each other with optical communication.

The personal computer 5 displays, for example, data DT received through, for example, the communicator unit 4. The personal computer 5 may display various parameters to be used in the multi-optical axis photoelectric sensor SNS. In addition to the personal computer 5 or instead of the personal computer 5, the display circuit 19 may display such parameters. Alternatively, another display for displaying the sets of information described above (e.g., a dedicated console) may be connected to the communicator unit 4.

FIG. 4 is a diagram showing the structure of the personal computer 5 shown in FIG. 3. In FIG. 4, the personal computer 5 includes a controller 51, which controls the entire computer, an input unit 55, which receives input data, a storage unit 53, which temporarily stores data, a display unit 57, which outputs data, and an external storage unit 59, which is a nonvolatile memory and may store programs to be executed by the controller 51.

The controller 51 includes a CPU, a read-only memory (ROM) for storing programs to be executed by the CPU, and a random-access memory (RAM) that may store variables used in executing programs by the CPU.

The input unit 55 is a keyboard or a mouse, and can receive input letters and numbers, or can receive predetermined commands. The input unit 55 also receives data transmitted from the communicator unit 4.

The storage unit 53 temporarily stores sets of data used for setting of the multi-optical axis photoelectric sensor SNS.

The display unit 57 is, for example, a liquid crystal display. The display unit 57 displays sets of information as instructed by the controller 51. The display unit 57 displays information including the operational results of the multi-optical axis photoelectric sensor SNS, and the setting values for floating blanking and blanking monitoring, which are obtained through teaching (described later).

The external storage unit 59 reads a program or data stored in a processor readable recording medium 61, and transmits the read program or data to the controller 51. The processor readable recording medium 61 may be a tape medium such as a magnetic tape and a cassette tape, a disk medium such as a magnetic disk (a flexible disk or a hard disk) and an optical disk (a CD-ROM or a DVD), a card medium such as an integrated circuit (IC) card (including a memory card) or an optical card, or a programmed medium such as a semiconductor memory, like a mask ROM, an erasable programmable read only memory (EPROM), and a flash memory. The program may be downloaded from a network (not shown). The controller 51 reads a program from the recording medium 61 by using the external storage unit 59, and can execute the read program.

A program enabling the personal computer 5 (processor) to implement the steps included in a method for controlling the multi-optical axis photoelectric sensor system according to the embodiment may be a program stored in the recording medium 61. The program enabling the personal computer 5 (processor) to implement the steps may be stored in any other device. For example, the program may be stored in the storage circuit 14 of the emitter unit 1 or in the storage circuit 29 of the receiver unit 2. The processor that implements the steps may not be a computer, such as the personal computer 5. For example, the steps may be implemented by a mobile terminal that is connectable to a network (not shown) or a controller that controls the manufacturing equipment.

In the present embodiment, the multi-optical axis photoelectric sensor system 100 outputs data to an external device through the screen display of the display unit 57. The data may be output to the external storage unit 59 or to the recording medium 61, or may be printed out by a printer.

In the present embodiment, the multi-optical axis photoelectric sensor system 100 includes a detection processing unit that determines the occurrence of light interruption of the entire detection area LC (FIG. 1) every after optical axis selection corresponding to one cycle (one scan) in the multi-optical axis photoelectric sensor SNS, and outputs a detection signal indicating the determination result. More specifically, the detection processing unit determines whether each optical axis is in an interrupted state every after optical axis selection corresponding to one scan, and combines the determination results for these optical axes and determines the occurrence of light interruption of the entire detection area LC. When the detection area LC is not interrupted, the detection processing unit outputs a signal indicating a non-detected state. When the detection area LC is at least partially interrupted, the detection processing unit outputs a signal indicating a detected state.

When at least one of the optical axes is constantly interrupted by the specific object OB that is movable in the detection area LC as shown in FIG. 1, the floating blanking is activated. When the floating blanking is activated, the detection processing unit nullifies the determination results for light interruption of the at least one optical axis interrupted by the specific object OB. More specifically, the detection processing unit outputs a signal indicating a detected state when the number of optical axes that are determined interrupted is greater than a preset maximum optical axis number. The detection processing unit also outputs a signal indicating a detected state when the number of optical axes that are determined interrupted is smaller than a preset minimum optical axis number. The maximum optical axis number and the minimum optical axis number correspond to the setting values for floating blanking and blanking monitoring, which will be described later.

The multi-optical axis photoelectric sensor system 100 further includes a teaching processing unit that performs teaching using the object OB to optimize the setting values for floating blanking and blanking monitoring for actual applications.

Each of the detection processing unit and the teaching processing unit included in the multi-optical axis photoelectric sensor system 100 may be formed by the processor circuit included in the receiver unit 2, the processor circuit 16 included in the emitter unit 1, or the personal computer 5. The detection processing unit and the teaching processing unit may be integrated into a single processor circuit (control circuit).

Teaching

Teaching implemented by the multi-optical axis photoelectric sensor system 100 according to the present embodiment will now be described.

FIG. 5 is a schematic diagram showing the operational modes used in the multi-optical axis photoelectric sensor system 100 and the relationship between these modes.

Referring to FIG. 5, the multi-optical axis photoelectric sensor system 100 has two modes, which are a detection mode and a teaching mode. The detection mode is intended for a normal object detection process.

In the detection mode, light emission and reception is performed between the emitter unit 1 and the receiver unit 2. In this light emission and reception process, the processor circuit 16 (FIG. 3) generates a timing signal for generating a signal beam at every predetermined time, and provides the signal to the optical axis sequential selector circuit 13. The optical axis sequential selector circuit 13 sequentially connects the drive circuit 12 corresponding to each emitter element 11 to the processor circuit 16. As a result, the processor circuit 16 sequentially outputs a timing signal to each drive circuit 12. This achieves the sequential illumination of the emitter elements 11. The timing signal is further provided to the processor circuit 26 included in the receiver unit 2 through the communication circuits 17 and 27.

In the receiver unit 2, an output of light reception from each receiver element 21 is transmitted to the processor circuit 26 through the amplifier 22 and the switch 23. The processor circuit 26 transmits a timing signal from the emitter unit 1 to the optical axis sequential selector circuit 25 to sequentially turn on the switch 23 associated with each optical axis, and receives an output of light reception from the receiver element 21 corresponding to the emitter element 11 that has emitted a signal beam. The processor circuit 26 then compares the light receiving output from each receiver element 21 with a predetermined threshold to determine whether the corresponding optical axis is in an interrupted state. Upon completing the reception of light receiving outputs for all the optical axes, the processor circuit 26 combines the determination results for the optical axes to obtain a final determination result, and generates a detection signal indicating the determination result and outputs the generated detection signal from the output circuit 31 to an external device.

In the teaching mode, the setting values for floating blanking and blanking monitoring are determined through teaching performed using the specific object OB. In the teaching mode, the light emission and reception process identical to the process in the detection mode is performed. The determination results for light interruption of the optical axes obtained in this light emission and reception process is used to calculate the setting values for floating blanking and blanking monitoring, which are then set.

The multi-optical axis photoelectric sensor system 100 starts operating in the detection mode immediately after the system is powered. Upon receiving a command for shifting to the teaching mode, the multi-optical axis photoelectric sensor system 100 switches its operation mode to the teaching mode. The command for shifting to the teaching mode may be input from, for example, the input unit 55 of the personal computer 5. The command for shifting to the teaching mode may also be provided in response to an operation to turn on a switch operable by the user arranged on the emitter unit 1 or the receiver unit 2.

Upon receiving a command for ending the teaching mode, the multi-optical axis photoelectric sensor system 100 operating in the teaching mode ends the teaching mode and returns to the detection mode. The command for ending the teaching mode may be input from the input unit 55 of the personal computer 5. The command for ending the teaching mode may also be provided in response to an operation to turn off the switch operable by the user arranged on the emitter unit 1 or the receiver unit 2. The command for ending the teaching mode may also be provided from the controller 51 of the personal computer 5 when a predetermined continuous time passes from the start of the teaching mode.

The processing performed in the teaching mode with floating blanking being activated will now be described.

Teaching for Floating Blanking

As shown in FIG. 1, the floating blanking can be activated when the specific object OB is moving within the detection area LC. The floating optical axis number, which is the number of optical axes to be nullified, is set in accordance with the size and the position of the object OB within the detection area. This nullifies the determination results of light interruption for the number of optical axes corresponding to the floating optical axis number.

In an actual application, the object OB may irregularly change its position within the detection area LC due to vibrations of the machine or other factors. FIGS. 6A and 6B are schematic diagrams of the detection area LC (FIG. 1) viewed in the direction of the optical axes. As shown in FIGS. 6A and 6B, the detection area LC includes a plurality of optical axes B1 to Bn (n is an integer not less than 2). In each of FIGS. 6A and 6B, the square indicates a part of the object OB. In the figures, a white circle indicates an optical axis in a light-entering state, and a black circle indicates an optical axis in an interrupted state.

In FIGS. 6A and 6B, the same object OB interrupts light but at different positions in the detection area LC. Between FIGS. 6A and 6B, different numbers of optical axes are interrupted at different positions. In other words, irregularly changing the position of the object OB can change the number of optical axes that are interrupted.

The multi-optical axis photoelectric sensor system 100 constantly monitors the presence of the object OB within the detection area LC during use of floating blanking. When the object OB moves out of the detection area LC or becomes smaller in the detection area LC, one or more (or all) of the optical axes to be interrupted may be in a light-entering state. In this case, the system determines that the floating blanking has an abnormality, and forcibly stops the operation of the machine, or may deactivate the floating blanking to activate the entire detection area LC.

In detail, under the floating blanking remaining activated after the object OB moves out of the detection area LC, the multi-optical axis photoelectric sensor SNS may fail to detect another object (e.g., a human body) entering the detection area LC if the number of optical axes interrupted by the other object is not more than the floating optical axis number. To avoid this situation and achieve the safety function of the multi-optical axis photoelectric sensor SNS, the multi-optical axis photoelectric sensor system 100 is capable of monitoring the presence of the object OB (blanking monitoring). More specifically, the multi-optical axis photoelectric sensor system 100 achieves both productivity and safety at the production site by activating floating blanking and blanking monitoring in parallel.

However, as shown in FIGS. 6A and 6B, when the number of interrupted optical axes changes as the object OB moves irregularly in the detection area LC, an optical axis in an interrupted state may switch to a light-entering state. In this case as well, the blanking monitoring being activated detects an abnormality in the floating blanking, and forcibly stops the machine. In other words, the blanking monitoring may have an erroneous determination due to irregular changes in the position of the object OB. This may stop the machine unexpectedly and degrade the productivity at the production site.

For the floating blanking used in the embodiment of the present invention, the number of optical axes to be excluded from blanking monitoring, which is referred to as the excluded optical axis number, is set in addition to the floating optical axis number. In the example of FIGS. 6A and 6B, the number of optical axes that can switch from an interrupted state to a light-entering state due to irregular changes in the position of the object OB is set as the excluded optical axis number. This setting prevents the machine from being stopped by malfunctioning of the blanking monitoring.

To enable the floating blanking and the blanking monitoring to function correctly, the floating optical axis number and the excluded optical axis number need to be optimized correctly for an actual application. In the embodiment of the present invention, teaching is performed using an actual application. In the teaching process, the floating optical axis number and the excluded optical axis number are calculated based on the determination results for light interruption of the optical axes accumulated per cycle (one scan) of the light emission and reception process performed between the emitter unit 1 and the receiver unit 2 in an actual application. The floating optical axis number and the excluded optical axis number are calculated and updated every after the light emission and reception process corresponding to one scan. Alternatively, the floating optical axis number and the excluded optical axis number may be calculated based on the determination results for light interruption of the optical axes after the light emission and reception process corresponding to multiple scans. In this case, the floating optical axis number and the excluded optical axis number can be optimized for an actual application correctly as well as promptly.

Figure 7:
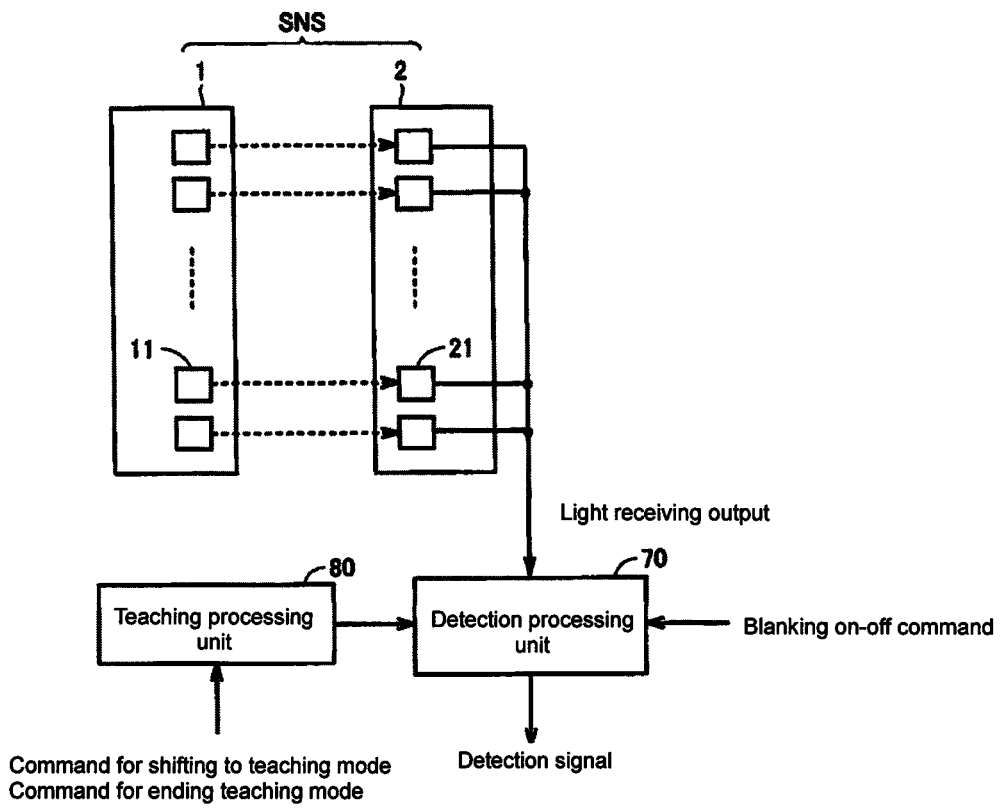
FIG. 7 is a block diagram of a control mechanism of the multi-optical axis photoelectric sensor system according to the embodiment.

A control mechanism associated with the floating blanking and the teaching will now be described. FIG. 7 is a block diagram of the control mechanism included in the multi-optical axis photoelectric sensor system 100 according to the present embodiment.

Figure 8:
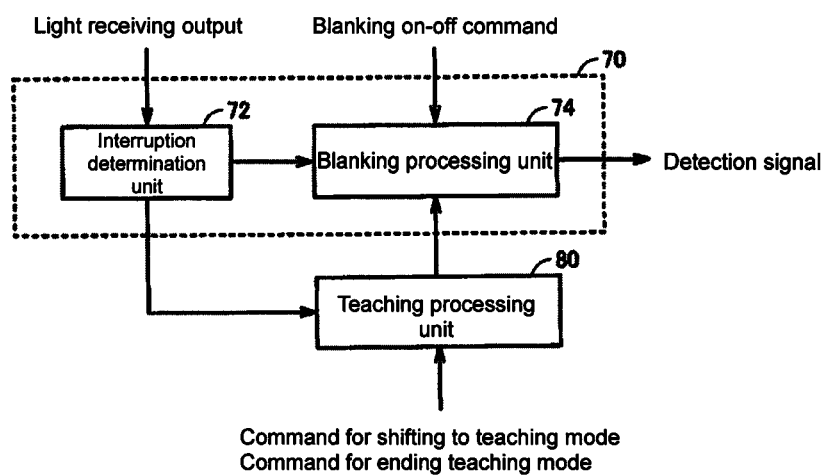
FIG. 8 is a diagram showing the detailed structure of a detection processing unit shown in FIG. 7.

As shown in FIG. 7, the control mechanism of the multi-optical axis photoelectric sensor system 100 includes a detection processing unit 70 and a teaching processing unit 80. The detection processing unit 70 determines the occurrence of light interruption of the entire detection area LC (FIG. 1) every after optical axis selection corresponding to one scan in the multi-optical axis photoelectric sensor SNS, and outputs a detection signal indicating the determination result. FIG. 8 is a diagram showing the detailed structure of the detection processing unit 70. As shown in FIG. 8, the detection processing unit 70 includes an interruption determination unit 72 and a blanking processing unit 74.

The interruption determination unit 72 determines whether each optical axis is in an interrupted state based on a light receiving output from each receiver element 21 every after the light emission and reception process corresponding to one scan performed between the emitter unit 1 and the receiver unit 2. The interruption determination unit 72 combines the determination results for the optical axes and determines the occurrence of light interruption of the entire detection area LC, and outputs a signal indicating the determination result to the blanking processing unit 74.

The blanking processing unit 74 outputs a detection signal indicating the determination result obtained from the interruption determination unit 72. The blanking processing unit 74 receives either a blanking-on command for activating the floating blanking or a blanking-off command for deactivating the floating blanking. In response to a blanking-on command, the blanking processing unit 74 activates the floating blanking. In response to a blanking-off command, the blanking processing unit 74 deactivates the floating blanking. The blanking-on command or the blanking-off command may be input from the input unit 55 of the personal computer 5. The blanking-on command or the blanking-off command may also be provided in response to an operation to turn on a switch operable by the user arranged on the emitter unit 1 or the receiver unit 2.

Under the floating blanking being activated, the blanking processing unit 74 nullifies the determination results of light interruption for optical axes that are temporarily interrupted by the moving object OB. More specifically, the blanking processing unit 74 determines whether any optical axis other than the optical axes interrupted by the object OB is interrupted based on the floating optical axis number preset by the teaching processing unit 80. When determining that any optical axis other than those interrupted optical axes is interrupted, the blanking processing unit 74 outputs a signal indicating a detected state.

The blanking processing unit 74 constantly monitors the presence of the object OB in the detection area LC using the excluded optical axis number preset by the teaching processing unit 80. In this case, the blanking processing unit 74 also outputs a signal indicating a detected state when determining that the object OB has moved out of the detection area LC or has become smaller in the detection area LC.

Under the floating blanking being deactivated, the blanking processing unit 74 outputs a signal indicating a detected state when the detection area LC is at least partially interrupted. In response to a signal indicating a detected state from the multi-optical axis photoelectric sensor SNS, the power supply circuit of the machine stops supplying power to the machine. This places the machine in safety.

To use the floating blanking, the floating optical axis number, the excluded optical axis number, and a floating activated area in which the floating blanking is activated are preset in accordance with the size of the object OB and the position of the object OB in the detection area LC. In response to a command for switching to the teaching mode, the teaching processing unit 80 performs teaching using the object OB to optimize the floating optical axis number, the excluded optical axis number, and the floating activated area for an actual application.

Each of the detection processing unit 70 and the teaching processing unit 80 may be formed by the processor circuit included in the receiver unit, the processor circuit 16 included in the emitter unit 1, or the personal computer 5. The detection processing unit and the teaching processing unit may be integrated into a single processor circuit (control circuit). The interruption determination unit 72, which determines light interruption of each optical axis based on a light receiving signal output from the receiver element 21, can be achieved by, for example, either the optical axis sequential selector circuit 25 or the processor circuit 26, or by both the two circuits.

Figure 9:
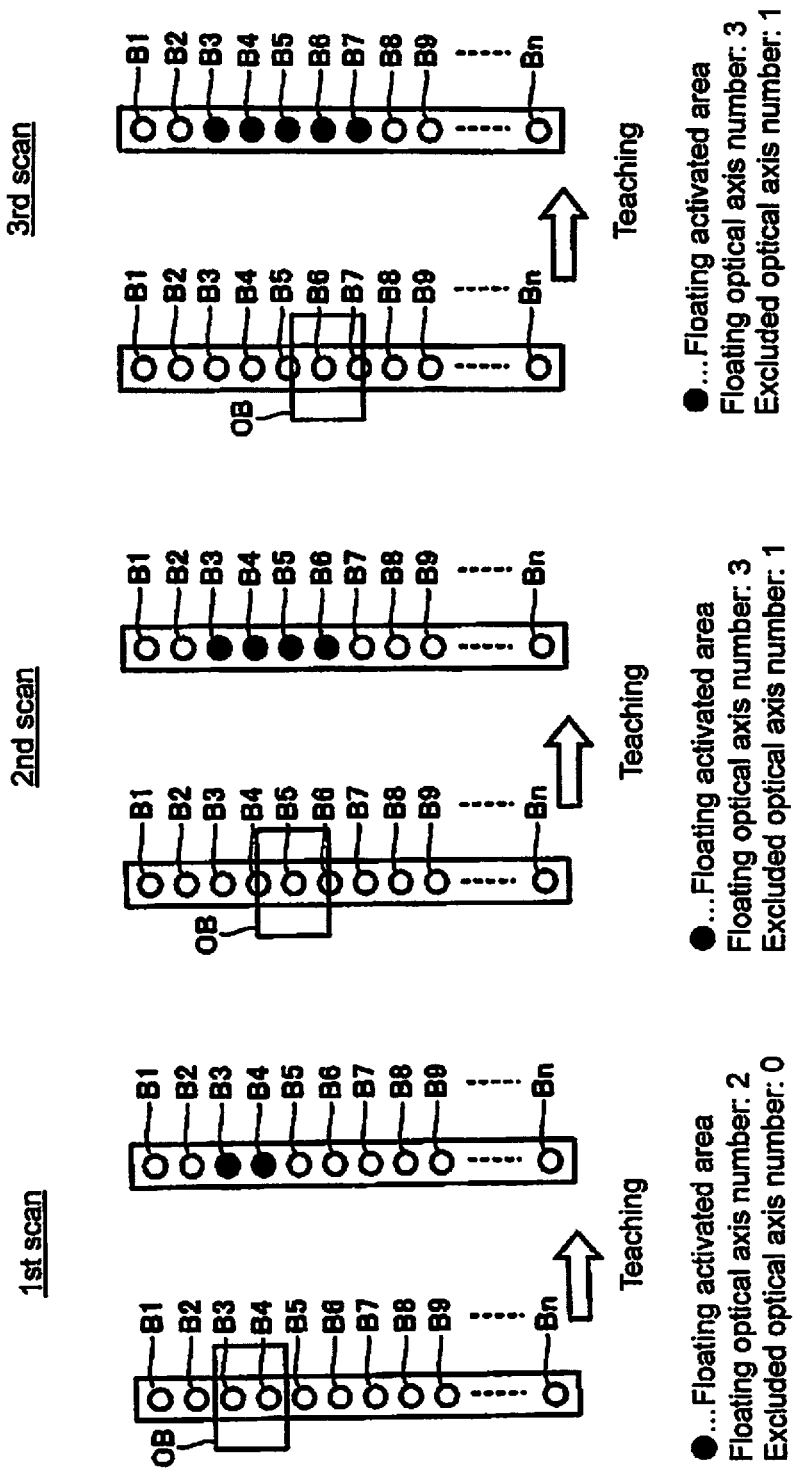
FIG. 9 is a diagram describing a teaching process for floating blanking.

FIG. 9 is a diagram describing a teaching process for floating blanking. FIG. 9 schematically shows the detection area LC (FIG. 1) viewed in the direction of the optical axes in the same manner as in FIGS. 6A and 6B. More specifically, the detection area LC includes a plurality of optical axes B1 to Bn (n is an integer not less than 2). In the figures, the square indicates a part of the object OB. In the figures, a white circle indicates an optical axis in a light-entering state, and a black circle indicates an optical axis in an interrupted state.

In the example described with reference to FIG. 9, the light emission and reception process corresponding to three scans is performed, and the floating optical axis number, the excluded optical axis number, and the floating activated area are set for every scan. In the first scan, the optical axes B3 and B4, among the optical axes B1 to Bn, are interrupted by the object OB. In this case, the floating optical axis number is set at 2, and the optical axes B3 and B4 define an area interrupted by the object OB, which is set as the floating activated area. The excluded optical axis number is set at 0.

In the second scan, the optical axes B4 and B6 are interrupted by the object OB, which has moved. More specifically, the optical axes B5 and B6 newly define an interrupted area in the second scan, whereas the optical axis B3 is not interrupted any more. In this case, the optical axes B3 to B6 are set as the floating activated area based on the logical sum of the interrupted area in the first scan (the optical axes B3 and B4) and the interrupted area in the second scan (the optical axes B4 to B6).

In the second scan, the floating optical axis number is set at 3 based on the interrupted area (the optical axes B4 to B6). The excluded optical axis number is set at 1 (=3−2), which is a difference between the floating optical axis number (the maximum interrupted optical axis number) in the second scan and the floating optical axis number (the minimum interrupted optical axis number) in the first scan.

In the third scan, the optical axes B5 to B7 are interrupted by the object OB, which has moved further. As compared with the second scan, the optical axis B7 newly defines an interrupted area in the third scan, whereas the optical axes B3 and B4 are not interrupted anymore. In this case, the optical axes B3 to B7 are set as the floating activated area based on the logical sum of the interrupted area in the second scan (the optical axes B3 to B6) and the interrupted area in the third scan (the optical axes B5 to B7).

In the third scan, the floating optical axis number is set at 3 based on the interrupted area (the optical axes B5 to B7). The excluded optical axis number is set at 1 (=3−2), which is a difference between the floating optical axis number in the second and third scans (the maximum interrupted optical axis number) and the floating optical axis number in the first scan (the minimum interrupted optical axis number).

As described above, the floating activated area, the floating optical axis number, and the excluded optical axis number are set based on the results of comparison for the interrupted area and the number of interrupted optical axes obtained per scan. The floating activated area corresponds to the logical sum of the interrupted area obtained per scan. The floating optical axis number corresponds to the maximum interrupted optical axis number per scan. The excluded optical axis number corresponds to a difference between the maximum interrupted optical axis number per scan (the floating optical axis number) and the minimum interrupted optical axis number per scan. These setting values reflect changes in the position of the object OB in an actual application. Through the teaching process according to the present embodiment, the floating activated area, the floating optical axis number, and the excluded optical axis number are correctly and promptly optimized for an actual application.

Figure 10:
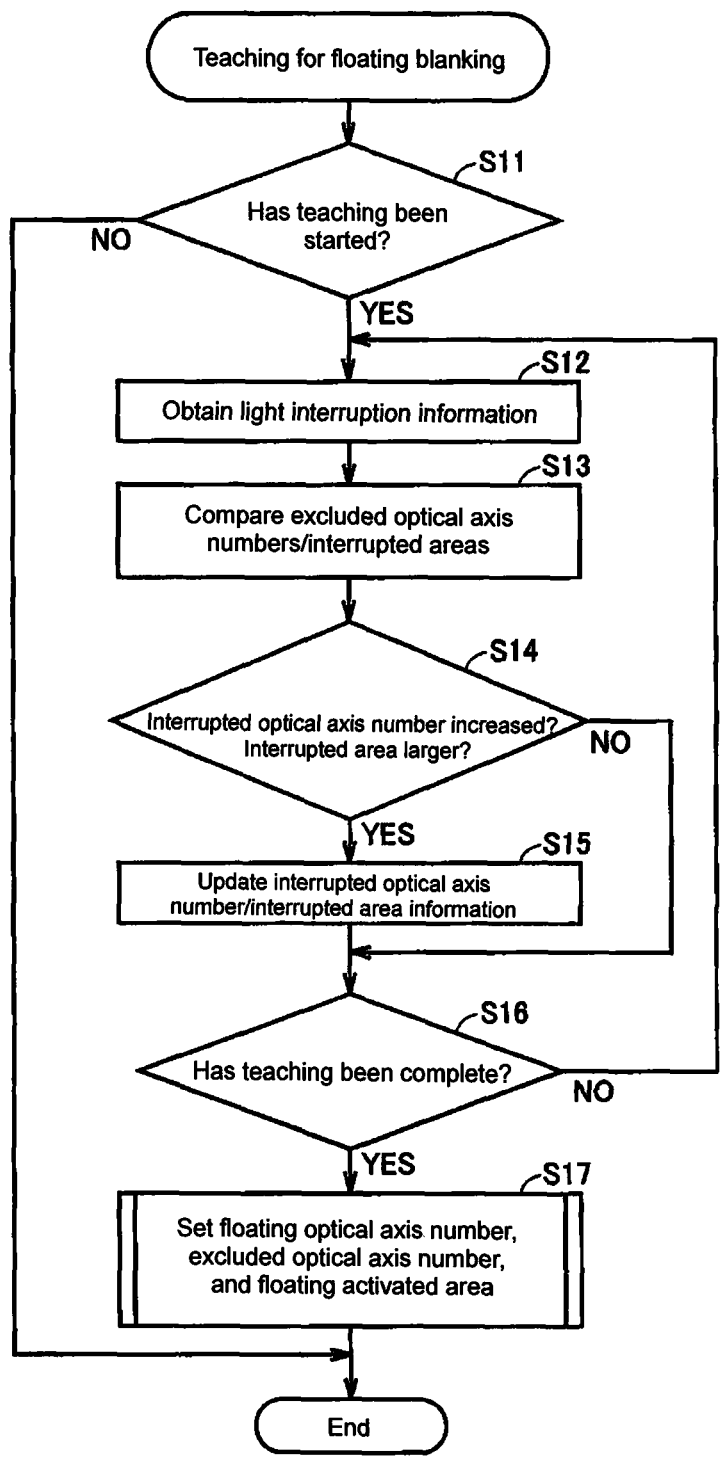
FIG. 10 is a flowchart showing the teaching process for floating blanking.

FIG. 10 is a flowchart showing the teaching process for floating blanking. The processing shown in FIG. 10 or other figures is implemented by functional units responsible for control in the multi-optical axis photoelectric sensor system 100. The processing described below may be performed by any unit other than specific functional units. More specifically, the steps included the flowchart may be implemented by, for example, any of the microcomputer 36 included in the communicator unit 4, the processor circuits 16 and 26, and the personal computer 5.

Referring to FIG. 10, the teaching processing unit 80 determines whether the teaching has been started (step S11). The determination as to whether the teaching has been started is performed by, for example, referring to a parameter that is input into the input unit 55 included in the personal computer 5 or the setting of the switch arranged on the emitter unit 1 or the receiver unit 2.

When determining that the teaching has been started in response to a command for switching to the teaching mode (YES in step S11), the teaching processing unit 80 (FIG. 7) obtains information indicating a determination result as to whether each optical axis in the detection area LC is in an interrupted state (hereafter also referred to as "light interruption information") every after the light emission and reception process corresponding to one scan (step S12).

When detecting the interrupted area and the interrupted optical axis number based on the obtained light interruption information, the teaching processing unit 80 compares the detected interrupted area and the detected interrupted optical axis number with the interrupted area and the interrupted optical axis number detected in the previous scan (step S13). Based on the comparison result, the teaching processing unit 80 determines whether the interrupted optical axis number in the current scan is greater than the interrupted optical axis number in the previous scan. The teaching processing unit 80 further determines whether the interrupted area in this scan is larger than the interrupted area in the previous scan (step S14).

When the interrupted optical axis number in the current scan is greater than the interrupted optical axis number in the previous scan (YES in step S14), the teaching processing unit 80 updates the maximum interrupted optical axis number to the interrupted optical axis number in this scan (step S15). When the interrupted area in this scan is larger than the interrupted area in the previous scan (YES in step S14), the teaching processing unit 80 also updates the interrupted area information to include the enlarged part of the interrupted area (step S15).

During teaching, the teaching processing unit 80 accumulates the light interruption information, the interrupted area information, and the interrupted optical axis number information. In the present embodiment, the light interruption information, the interrupted area information, and the interrupted optical axis number information may be stored in any storage device. For example, the data may be stored in any of the storage circuit 14 included in the emitter unit 1, the storage circuit 29 included in the receiver unit 2, and the storage circuit 39 included in the communicator unit 4. The data may be stored in the external storage unit 59 of the personal computer 5 or the recording medium 61.

During teaching, the teaching processing unit 80 can provide the user with the light interruption information, the interrupted area information, and the interrupted optical axis number information stored in the storage unit. In the embodiment of the present invention, an information providing unit that provides the light interruption information, the interrupted area information, and the interrupted optical axis number information may be achieved by the screen display performed by the display unit 57 included in the personal computer 5. The information providing unit may be any unit that can output the light interruption information, the interrupted area information, and the interrupted optical axis number information from the multi-optical axis photoelectric sensor system 100. For example, the light interruption information, the interrupted area information, and the interrupted optical axis number information may be printed out by a printer, or may be output to the external storage unit 59 or to the recording medium 61. Alternatively, the light interruption information, the interrupted area information, and the interrupted optical axis number information may be output to a mobile device, a controller for manufacturing equipment or a network that manages the manufacturing equipment.

Subsequently, the teaching processing unit 80 determines whether the teaching has been complete (step S16). The teaching ends in response to a command for ending the teaching mode (FIG. 5). The determination as to whether the command for ending the teaching mode has been provided can be performed by referring to, for example, a parameter input into the input unit 55 included in the personal computer 5 or the setting of the switch arranged on the emitter unit 1 or the receiver unit 2. The teaching processing unit 80 may also determine that the teaching process has been complete based on the command for ending the teaching mode provided by the controller 51 included in the personal computer 5 when a predetermined continuous time passes from the start of the teaching mode.

When the teaching has yet to be complete (NO in step S16), the teaching processing unit 80 continues the processing in steps S12 to S15. More specifically, the teaching processing unit 80 detects the interrupted area and the interrupted optical axis number every after the light emission and reception process corresponding to one scan, and accumulates the detected interrupted area as the interrupted area information and the detected interrupted optical axis number as the interrupted optical axis number information. When the teaching has been complete (YES in step S16), the teaching processing unit 80 calculates the floating activated area, the floating optical axis number, and the excluded optical axis number based on the accumulated interrupted area information and the accumulated interrupted optical axis number information (step S17). The floating activated area, the floating optical axis number, and the excluded optical axis number that have been calculated are provided to the user by the same information providing unit that provides the light interruption information and the interrupted area information described above.

Figure 11:
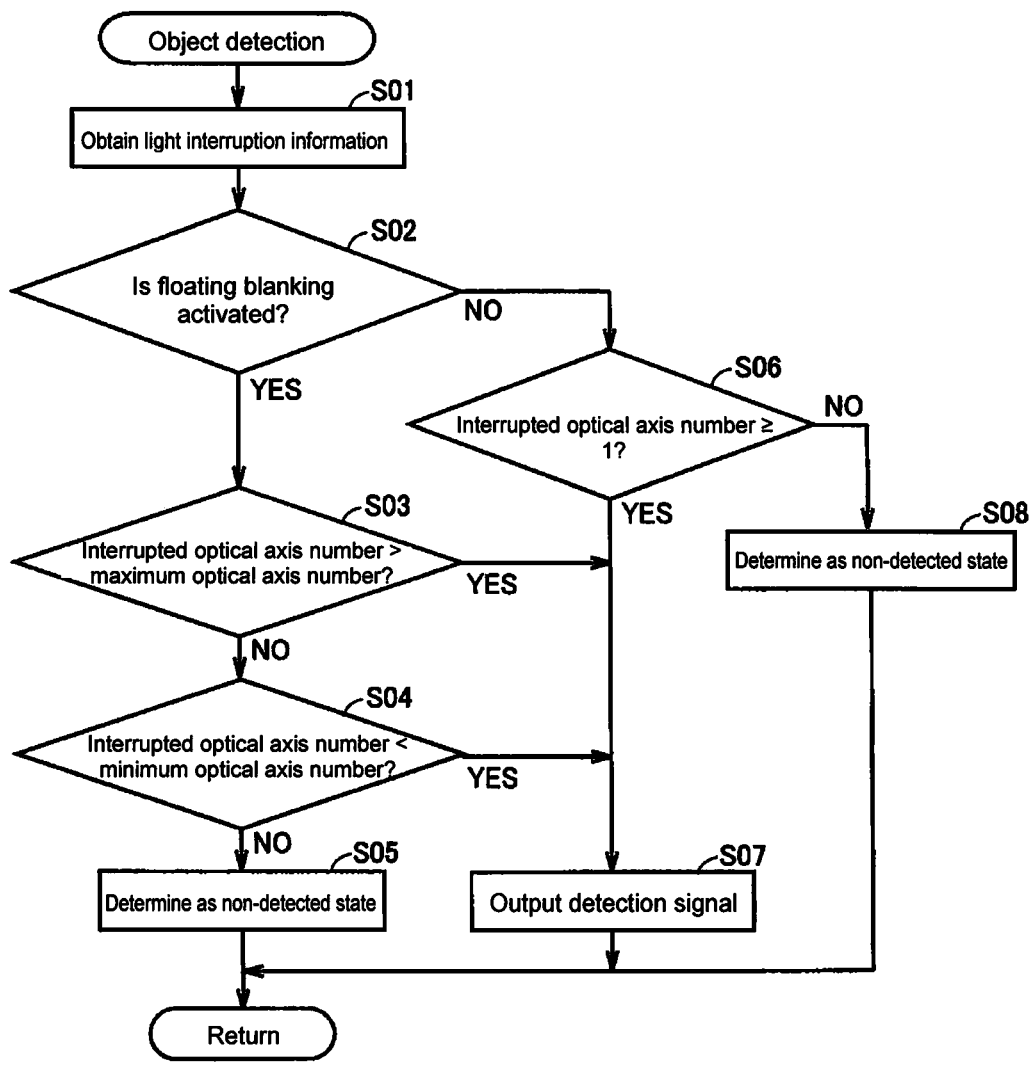
FIG. 11 is a flowchart showing an object detection process performed in the multi-optical axis photoelectric sensor system according to the embodiment.

The floating activated area, the floating optical axis number, and the excluded optical axis number set through the teaching process are provided to the detection processing unit 70 (FIG. 7). When the floating blanking is activated (set on) in the detection mode, the detection processing unit 70 performs an object detection process using these setting values. FIG. 11 is a flowchart showing the object detection process performed in the multi-optical axis photoelectric sensor system according to the present embodiment.

Referring to FIG. 11, when the operation mode is switched to the detection mode in response to a command for ending the teaching mode, the detection processing unit 70 obtains information indicating a result of determination as to whether each optical axis in the detection area LC is in an interrupted state (the light interruption information) every after the light emission and reception process corresponding to one scan (step S01).

The detection processing unit 70 then determines whether the floating blanking has been activated (step S02). When the floating blanking has been activated in response to a blanking-on command (YES in step S02), the detection processing unit 70 detects the interrupted optical axis number based on the obtained light interruption information, and then compares the detected interrupted optical axis number with the maximum optical axis number (step S03). The maximum optical axis number corresponds to the floating optical axis number set through the teaching process described above. In other words, the maximum optical axis number corresponds to the maximum interrupted optical axis number obtained in every scan performed in the teaching process.

When the interrupted optical axis number is greater than the maximum optical axis number (YES in step S03), the detection processing unit 70 determines that an optical axis other than the optical axes interrupted by the object OB is interrupted. In this case, the detection processing unit 70 outputs a signal indicating a detected state (step S07). In response to a signal indicating a detected state from the multi-optical axis photoelectric sensor system 100, the power supply circuit included in the machine stops supplying power to the machine. This places the machine in safety.

When the interrupted optical axis number is not greater than the maximum optical axis number (NO in step S03), the detection processing unit 70 compares the detected interrupted optical axis number with the minimum optical axis number (step S04). The minimum optical axis number corresponds to a value obtained by subtracting the excluded optical axis number from the floating optical axis number. More specifically, the minimum optical axis number corresponds to the minimum interrupted optical axis number obtained in every scan performed in the teaching process.

When the interrupted optical axis number is smaller than the minimum optical axis number (YES in step S04), the detection processing unit 70 determines that the object OB has moved out of the detection area LC or has become smaller in the detection area LC. In this case as well, the detection processing unit 70 outputs a signal indicating a detected state (step S07). More specifically, the detection processing unit 70 determines that the blanking has an abnormality, and forcibly stops the operation of the machine.

When the interrupted optical axis number is not smaller than the minimum optical axis number (NO in step S04), the detection processing unit 70 determines that the blanking is normal, and no optical axis other than the optical axes interrupted by the object OB is interrupted, and outputs a signal indicating a non-detected state (step S05).

When the floating blanking has been deactivated in response to a blanking-off command (NO in step S02), the detection processing unit 70 detects the interrupted optical axis number based on the obtained light interruption information, and determines whether the detected interrupted optical axis number is greater than or equal to 1 (step S06). When the detected interrupted optical axis number is greater than or equal to 1 (YES in step S06), the detection processing unit 70 determines that at least one of the optical axes defining the detection area LC is interrupted, and outputs a signal indicating a detected state (step S07). When the interrupted optical axis number is less than 1, or in other words the interrupted optical axis number is 0 (NO in step S06), the detection processing unit 70 determines that the detection area LC is not interrupted, and outputs a signal indicating a non-detected state (step S08).

Although the present embodiment describes the structure that uses the floating optical axis number as the maximum optical axis number and uses the value obtained by subtracting the excluded optical axis number from the floating optical axis number as the minimum optical axis number, the embodiment should not be limited to this structure. In the present embodiment, the maximum optical axis number and the minimum optical axis number are determined based on the result of comparison of the interrupted optical axis number obtained in every scan performed in the teaching process.

For example, the maximum optical axis number may be set as a value obtained by adding a predetermined optical axis number to the floating optical axis number set through the teaching process. The floating optical axis number corresponds to a determination value that can be used to determine whether light interruption of one or more optical axes is caused by the object OB. The predetermined optical axis number is obtained by adding a margin to the above determination value. The predetermined optical axis number may be set freely by examining and balancing the safety of the multi-optical axis photoelectric sensor system and the productivity at the production site.

Further, the minimum optical axis number may be set as a value obtained by subtracting the predetermined optical axis number further from the value obtained by subtracting the excluded optical axis number from the floating optical axis number. The value obtained by subtracting the excluded optical axis number from the floating optical axis number is a determination value used to determine that the object OB has moved out of the detection area LC or the object OB has become smaller in the detection area LC. The predetermined optical axis number is obtained by adding a margin to the above determination value used in such blanking monitoring. The predetermined optical axis number can be determined freely by examining and balancing the safety of the multi-optical axis photoelectric sensor system and the productivity at the production site.

Alternatively, the minimum optical axis number may be set as the value obtained by subtracting the excluded optical axis number from the floating optical axis number, and then the maximum optical axis number may be set as the value obtained by adding a predetermined optical axis number to the set minimum optical axis number. Alternatively, the floating optical axis number may be set as the maximum optical axis number, and then the minimum optical axis number may be set as the value obtained by subtracting a predetermined optical axis number from the set maximum optical axis number.

Figure 12:
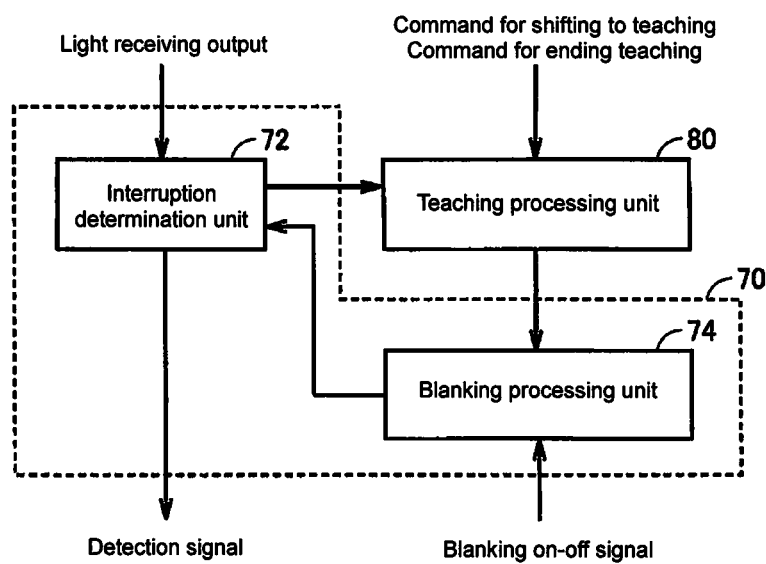
FIG. 12 is a block diagram of a control mechanism of a multi-optical axis photoelectric sensor system according to a modification of the embodiment.

In the control mechanism for performing the object detection process, the interruption determination unit 72 (FIG. 8) in the detection processing unit 70 first combines the determination results for light interruption of the optical axes, and determines the occurrence of light interruption of the entire detection area LC, and then the blanking processing unit 74 (FIG. 8) nullifies the determination results of some optical axes obtained by the interruption determination unit 72 under the floating blanking being activated. However, the embodiment should not be limited to this structure. For example, as shown in FIG. 12, the blanking processing unit 74 under the floating blanking being activated may set the maximum optical axis number and the minimum optical axis number in accordance with the floating optical axis number and the excluded optical axis number provided from the teaching processing unit 80, and may provide these setting values to the interruption determination unit 72. In this case, the interruption determination unit 72 compares the interrupted optical axis number obtained from the light interruption information with the maximum optical axis number and with the minimum optical axis number, and outputs a detection signal indicating the comparing result.

Operation of the Embodiment

In the embodiment of the present invention, the setting values for floating blanking and blanking monitoring are determined based on the determination results for light interruption of the optical axes accumulated through the teaching process performed using a specific object. More specifically, the setting values for floating blanking (the maximum optical axis number and the floating optical axis number) and the setting values for blanking (the minimum optical axis number and the excluded optical axis number) based on the interrupted area information and the interrupted optical axis number information obtained through the teaching. This optimizes the setting values for floating blanking and blanking monitoring correctly and promptly for an actual application.

The multi-optical axis photoelectric sensor known in the art typically determines these setting values through complicated calculations or the trial and error approach using an actual machine. Such settings take much time. This increases the number of manhours in installing the manufacturing equipment or replacing machines of the manufacturing equipment. In particular, the optical axes to be excluded from the blanking monitoring are set by the user based on his or her sense or through the trial and error approach. In this case, setting the values correctly and promptly has been difficult.

In the embodiment of the present invention, the teaching is performed using a specific object. The setting values for floating blanking and blanking monitoring are determined based on the determination results for light interruption of the optical axes obtained through the teaching. The resultant setting values reflect changes in the position of an object in an actual application. Thus, the setting values for floating blanking and blanking monitoring can be correctly and promptly optimized for an actual application.

In the embodiment of the present invention, in particular, the excluded optical axis number, which is a setting value for blanking monitoring, can be optimized promptly for an actual application. This prevents the manufacturing equipment from stopping due to irregular changes in the position of an object in an actual application. More specifically, the multi-optical axis photoelectric sensor system according to the embodiment of the present invention can readily achieve both productivity and safety.

Other Embodiments

Figure 13:
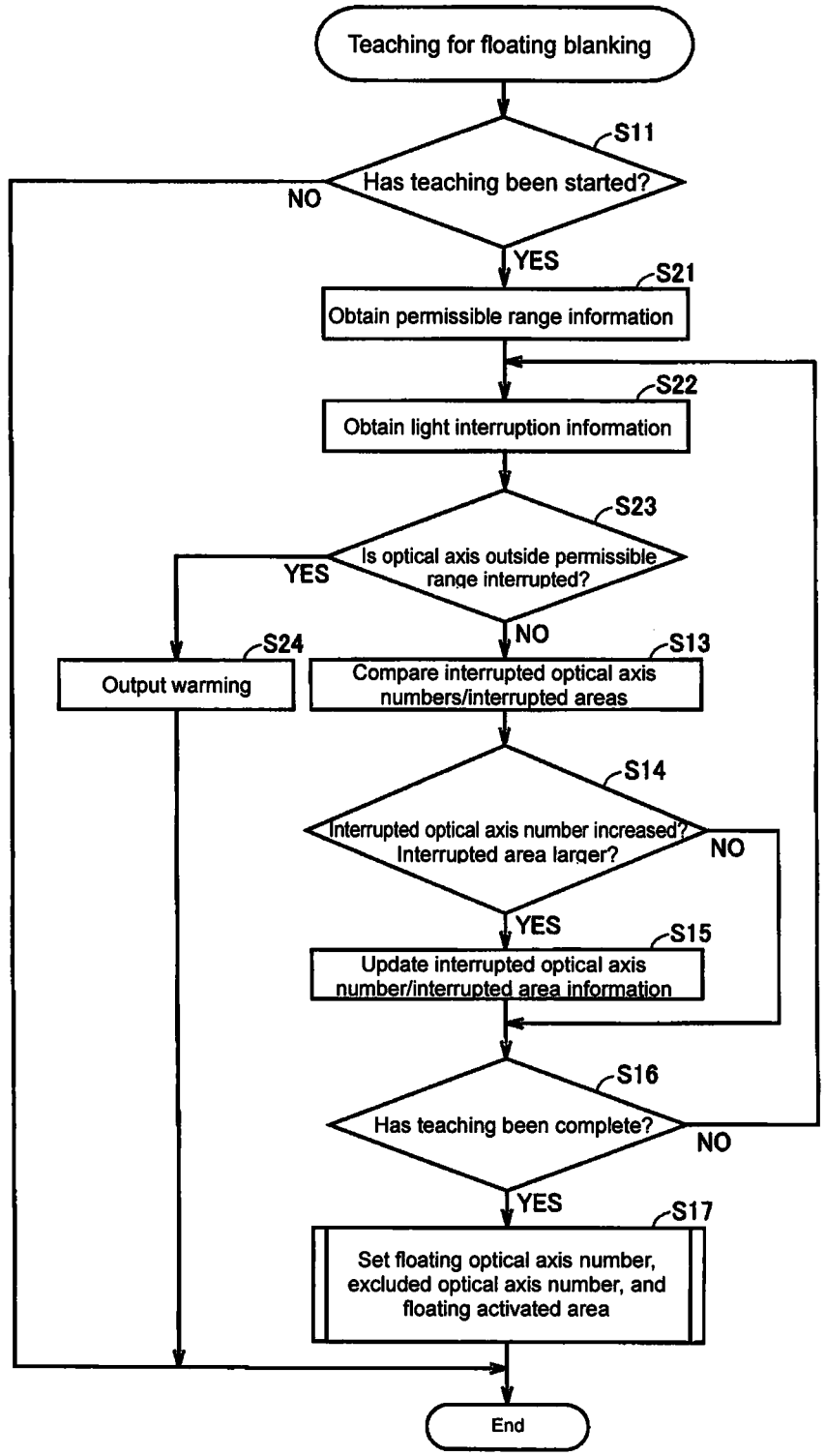
FIG. 13 is a flowchart showing an abnormality detection process performed during teaching.

A multi-optical axis photoelectric sensor system according to other embodiments described below has the same advantages as described in the above embodiment.
(1) Real Time Display The teaching processing unit according to embodiments of the present invention can update the setting value for floating blanking based on the determination results for light interruption of the optical axes accumulated every after the light emission and reception process corresponding to one scan. The teaching processing unit performs processing for displaying the updated setting value in real time during teaching. This display process may be performed by, for example, the display circuits 19 and 32 (FIG. 3) included in the multi-optical axis photoelectric sensor SNS or the display unit 57 (FIG. 4) included in the personal computer 5. The user can determine whether the teaching is being performed correctly by monitoring the displayed setting value.
(2) Abnormality Detection The teaching processing unit according to embodiments of the present invention performs processing for displaying a warning to the user when the setting value for the floating blanking is outside a predetermined permissible range. FIG. 13 is a flowchart showing this abnormality detection process performed during teaching for floating blanking.

Referring to FIG. 13, the teaching processing unit determines whether the teaching has been started in step S11 in the same manner as shown in FIG. 10. When determining that the teaching has been started (YES in step S11), the teaching processing unit 80 (FIG. 7) obtains information indicating the permissible range of the floating activated area (step S21). The teaching processing unit 80 determines the permissible range of the floating activated area based on the movable range of the object OB (FIG. 1) in the detection area LC.

When obtaining the light interruption information every after the light emission and reception process corresponding to one scan (step S22), the teaching processing unit 80 detects the interrupted area based on the light interruption information. The teaching processing unit 80 determines whether an optical axis outside the permissible range is in an interrupted state by comparing the detected interrupted area with the permissible range of the floating activated area (step S23).

When determining that an optical axis outside the permissible range is in an interrupted state (YES in step S23), the teaching processing unit 80 displays a warning to the user (step S24). This structure provides the user with information indicating that the setting value is incorrect and thus the teaching needs to start over again. As a result, the teaching processing unit 80 can prevent the floating blanking from being activated by the inappropriate setting value. In addition, the warning can be provided by, for example, blinking of light on the indicator lamps 10 and 20.

Figure 14:
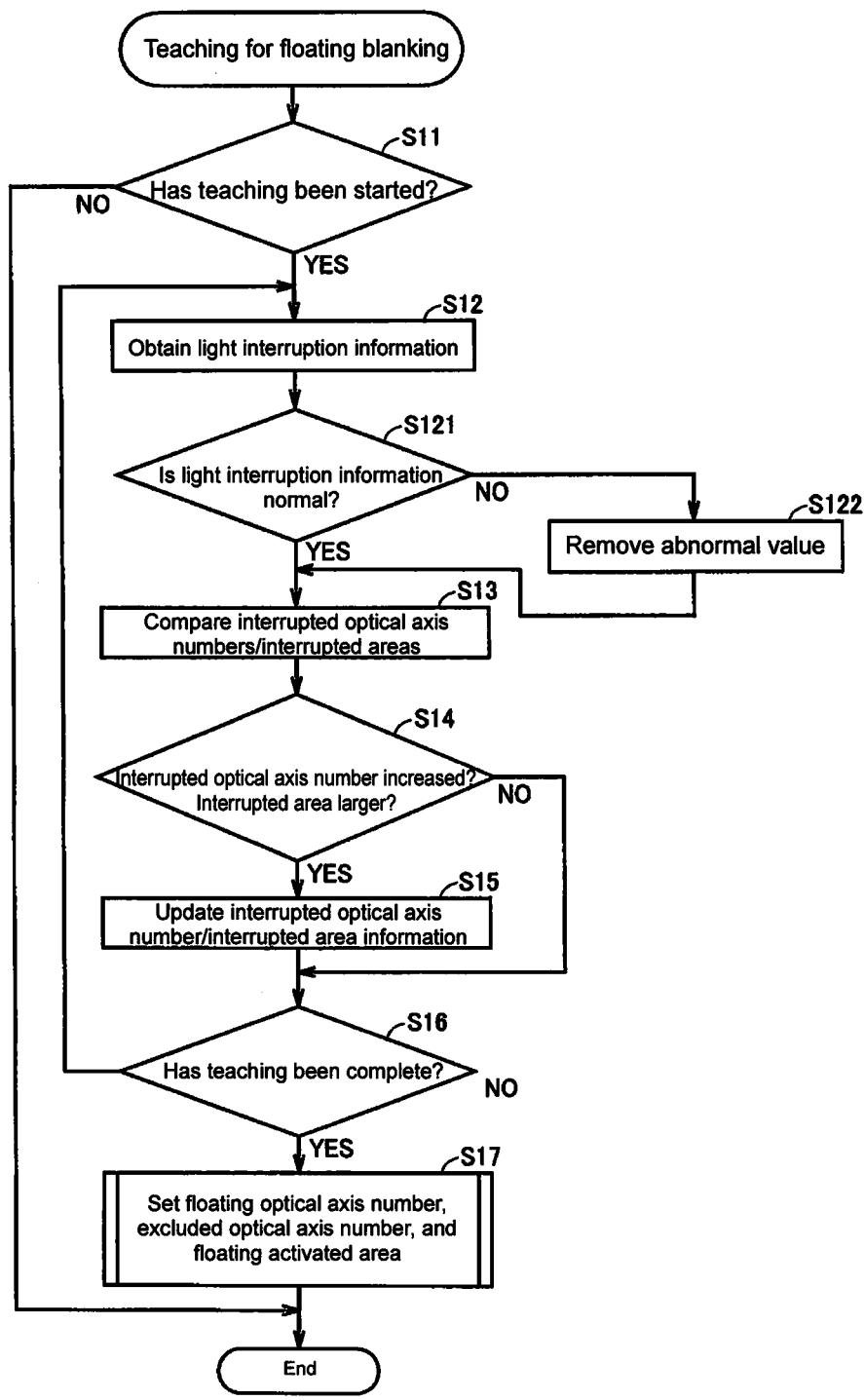
FIG. 14 is a flowchart showing a filtering process performed during teaching.

When the interrupted area is within the permissible range (NO in step S23), the teaching processing unit 80 performs the teaching in steps S13 to S17 in the same manner as shown in FIG. 10, and calculates the floating optical axis number, the excluded optical axis number, and the floating activated area. The floating optical axis number, the excluded optical axis number, and the floating activated area that have been calculated may be provided to the user by the same information providing unit that provides the light interruption information and the interrupted area information described above.
(3) Filtering The teaching processing unit 80 according to embodiments of the present invention performs a filtering process to exclude an abnormal value from the determination results for light interruption of the optical axes accumulated after every scan of a plurality of optical axes during teaching. FIG. 14 is a flowchart showing the filtering process performed during teaching for floating blanking.

Referring to FIG. 14, when teaching is started in steps S11 and S12 in the same manner as shown in FIG. 10, the teaching processing unit 80 obtains light interruption information every after the light emission and reception process corresponding to one scan. The teaching processing unit 80 determines whether the obtained light interruption information is normal (step S121). More specifically, the teaching processing unit 80 determines whether the optical axes in an interrupted state include any optical axis that is interrupted by an object other than the object OB. When determining that the interrupted optical axes include an optical axis that is interrupted by an object other than the object OB, the teaching processing unit 80 determines that the light interruption information has an abnormality. In this case, the teaching processing unit 80 removes the determination result for the optical axis (an abnormal value) from the light interruption information (step S122).

Subsequently, the teaching processing unit 80 performs teaching in steps S13 to S17 in the same manner as shown in FIG. 10, and calculates the floating optical axis number, the excluded optical axis number, and the floating activated area. The floating optical axis number, the excluded optical axis number, and the floating activated area that have been calculated may be provided to the user by the same information providing unit that provides the light interruption information or the interrupted area information described above.

As described above, apparent abnormal values are removed from the determination results obtained by the interruption determination unit. This enables correct values to be set for floating blanking. This filtering process may be preset before the teaching is started, or the user may manually remove abnormal values by referring to the accumulated determination results of light interruption of each optical axis.

(4) Detection Area Selection

Figure 15:
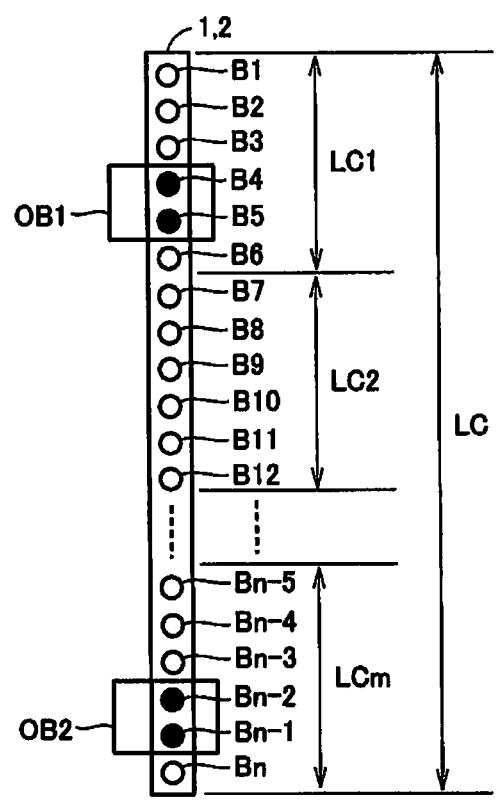
FIG. 15 is a diagram describing a detection area selection process.

The teaching processing unit according to embodiments of the present invention can set a plurality of setting values for floating blanking and blanking monitoring in the detection area. As shown in FIG. 15, the detection area may contain a plurality of objects OB1 and OB2 depending on the structure of the machine. For this structure, floating blanking may need to be performed independently for each object. The teaching processing unit 80 splits the detection area LC into a plurality of detection areas LC1 to LCm (m is an integer not less than 2), and performs teaching for each of the detection areas.

Figure 16:
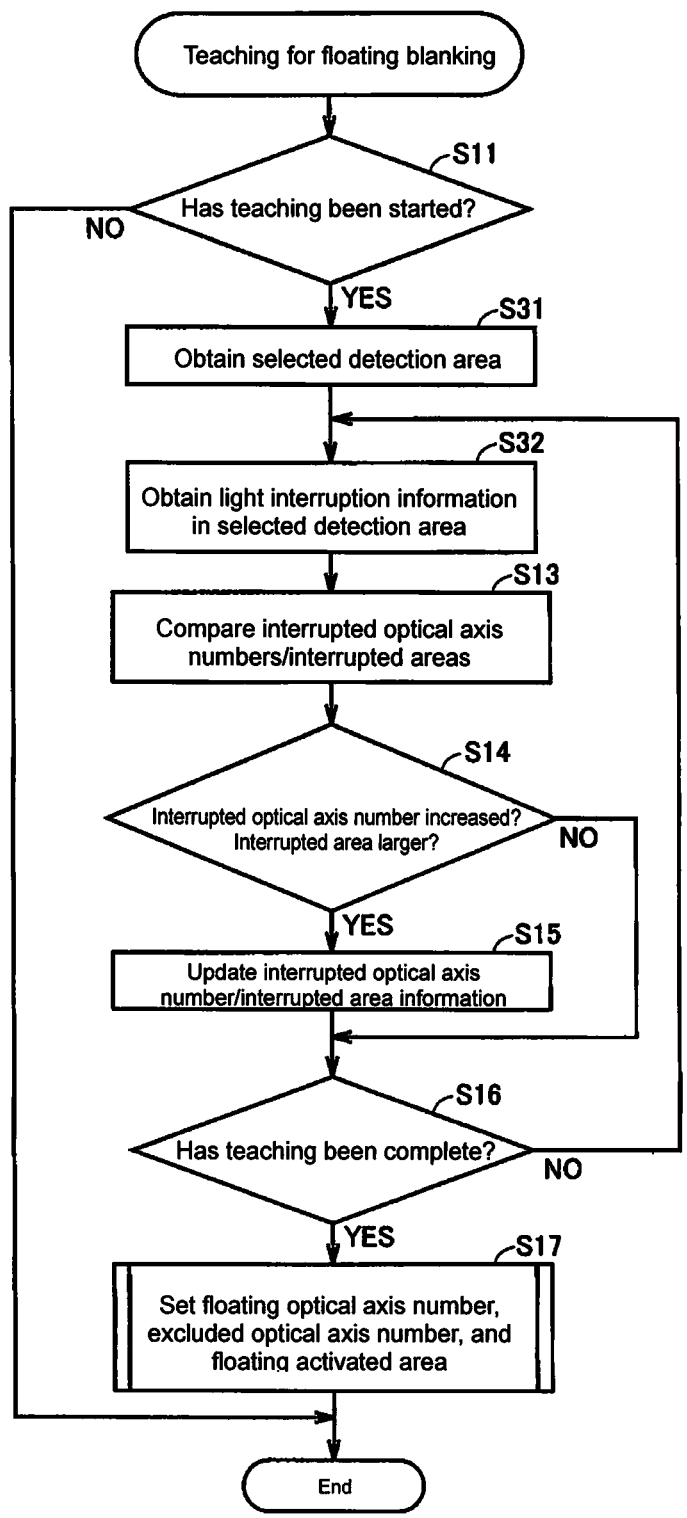
FIG. 16 is a flowchart showing the detection area selection process performed during teaching.

FIG. 16 is a flowchart showing a detection area selection process performed during teaching for floating blanking. Referring to FIG. 16, the teaching processing unit 80 determines whether the teaching has been started in step S11 in the same manner as shown in FIG. 10. When determining that the teaching has been started (YES in step S11), the teaching processing unit 80 obtains information indicating a detection area selected from the plurality of detection areas LC1 to LCm (step S31). The detection area to undergo teaching can be selected in accordance with the position and the size of at least one of the objects OB1 and OB2 (FIG. 14) in the detection area LC.

Subsequently, the teaching processing unit 80 obtains light interruption information in the selected detection area every after the light emission and reception process corresponding to one scan (step S32). The teaching processing unit 80 performs teaching in steps S13 to S17 in the same manner as shown in FIG. 10, and calculates the floating optical axis number, the excluded optical axis number, and the floating activated area. The floating optical axis number, the excluded optical axis number, and the floating activated area that have been calculated may be presented to the user by the same information providing unit that provides the light interruption information and the interrupted area information described above.

This structure enables correct and prompt settings of values for floating blanking and blanking monitoring for each of the plurality of objects in the detection area LC. The detection processing unit 70 can use the values set for different detection areas at the same time or selectively when the floating blanking is activated. More specifically, the detection processing unit 70 can select the optimum setting values in accordance with the position and the size of each object in the detection area LC.

In the above structure, the teaching processing unit 80 determines the setting values for floating blanking and blanking monitoring based on the determination results for light interruption of the optical axes selected from a plurality of optical axes. Selecting the optical axes to undergo teaching from a plurality of optical axes in advance in accordance with the position and the size of the object OB in the detection area reduces the processing load of the teaching process. When any optical axis other than the optical axes selected to undergo teaching is interrupted during teaching, the teaching processing unit 80 can determine that an object other than the specific object OB has entered the detection area LC, and can provide a warning to the user. This achieves safety during teaching.

(5) Sensor Selection

Figure 17:
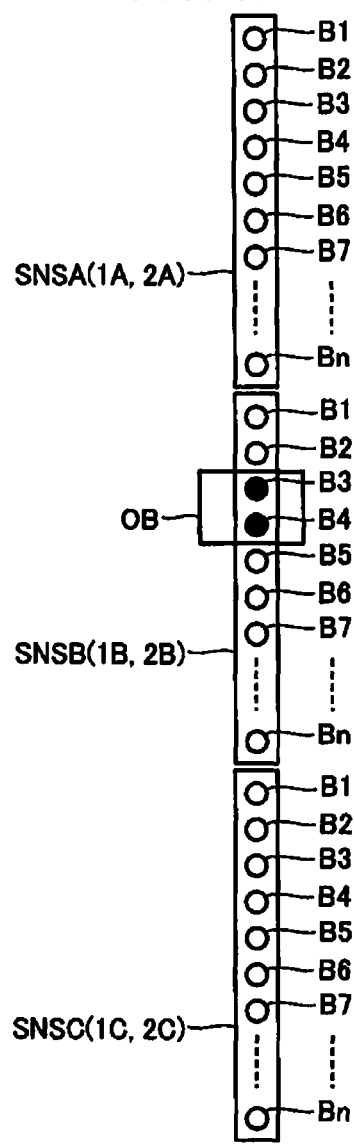
FIG. 17 is a diagram showing an example of a multi-optical axis photoelectric sensor system including a plurality of multi-optical axis photoelectric sensors.

The multi-optical axis photoelectric sensor system according to embodiments of the present invention may connect a plurality of multi-optical axis photoelectric sensors SNS by connecting their emitter units 1 to each other and connecting their receiver units 2 to each other. FIG. 17 is a diagram showing a multi-optical axis photoelectric sensor system including a plurality of multi-optical axis photoelectric sensors SNSA to SNSC. As shown in FIG. 17, three emitter units 1A to 1C are aligned linearly in a direction perpendicular to the optical axes. Three receiver units 2A to 2C are aligned linearly in the direction perpendicular to the optical axes to face the three emitter units 1A to 1C.

In this structure, the teaching processing unit 80 may perform a teaching process collectively for a plurality of multi-optical axis photoelectric sensors SNSA to SNSC or for each individual multi-optical axis photoelectric sensor. In the teaching process performed collectively for the multi-optical axis photoelectric sensors SNSA to SNSC, the teaching processing unit 80 determines a plurality of optical axes defined between the emitter units 1A to 1C and the receiver units 2A to 2C as a single collective area, and determines the setting values for the blanking based on the determination results for light interruption of the optical axes.

In the teaching process performed for each individual multi-optical axis photoelectric sensor, the teaching processing unit can select at least one multi-optical axis photoelectric sensor from the multi-optical axis photoelectric sensors SNSA to SNSC. The selection of the multi-optical axis photoelectric sensor for which data to be accumulated and analyzed may be performed by the user using, for example, the input unit 55 (FIGS. 6A and 6B) of the personal computer 5.

Figure 18:
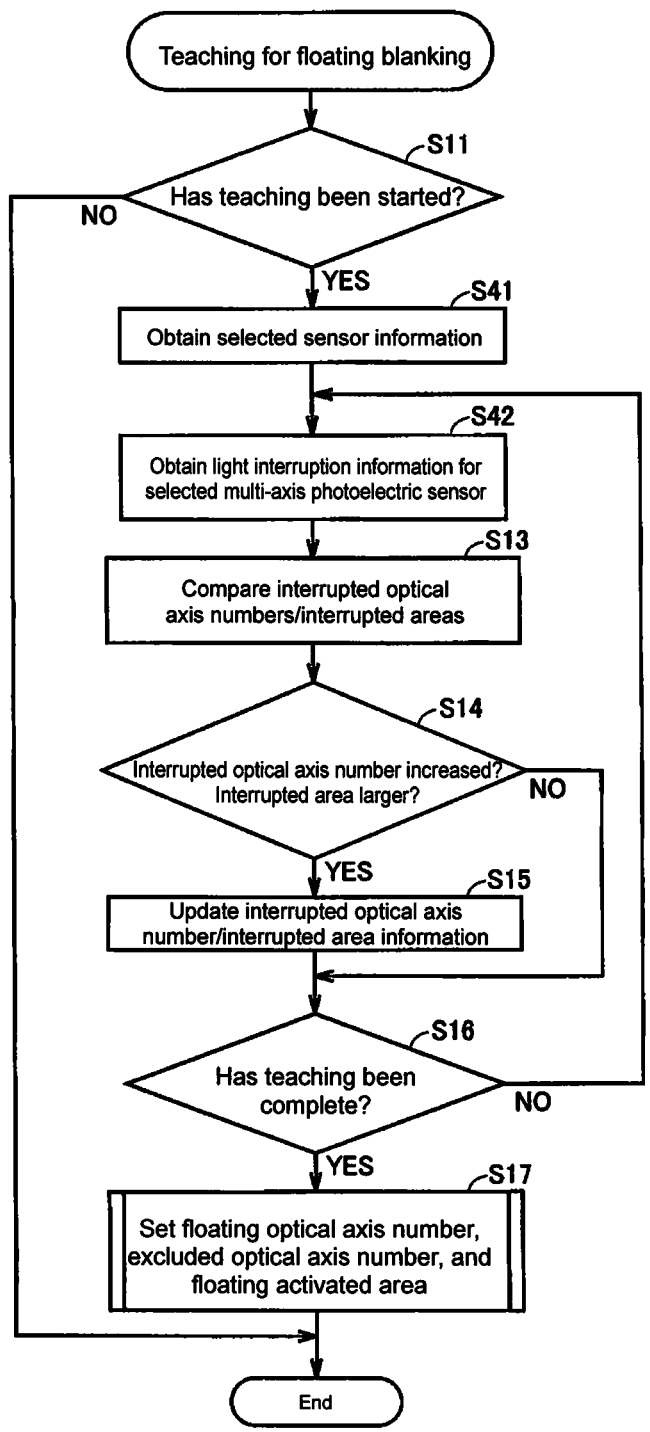
FIG. 18 is a flowchart showing a multi-optical axis photoelectric sensor selection process performed during teaching.

FIG. 18 is a flowchart showing a multi-optical axis photoelectric sensor selection process performed during teaching for floating blanking. Referring to FIG. 18, the teaching processing unit 80 determines whether the teaching has been started in step S11 in the same manner as shown in FIG. 10. When determining that the teaching has been started (YES in step S11), the teaching processing unit 80 obtains information indicating a multi-optical axis photoelectric sensor selected from a plurality of multi-optical axis photoelectric sensors SNSA to SNSC (step S41).

Subsequently, the teaching processing unit 80 obtains light interruption information in the selected detection area LC of the multi-optical axis photoelectric sensor every after the light emission and reception process corresponding to one scan (step S42). The teaching processing unit 80 performs teaching and calculates the floating optical axis number, the excluded optical axis number, and the floating activated area in steps S13 to S17 in the same manner as shown in FIG. 10. The floating optical axis number, the excluded optical axis number, and the floating activated area that have been calculated may be provided to the user by the same information providing unit that provides the light interruption information and the interrupted area information described above.

(6) Object Moving Speed Detection

The teaching processing unit 80 according to embodiments of the present invention can detect the moving speed of a specific object based on determination results obtained by the interruption determination unit that are accumulated through the light emission and reception process corresponding to every scan during teaching for floating blanking.

Figure 19:
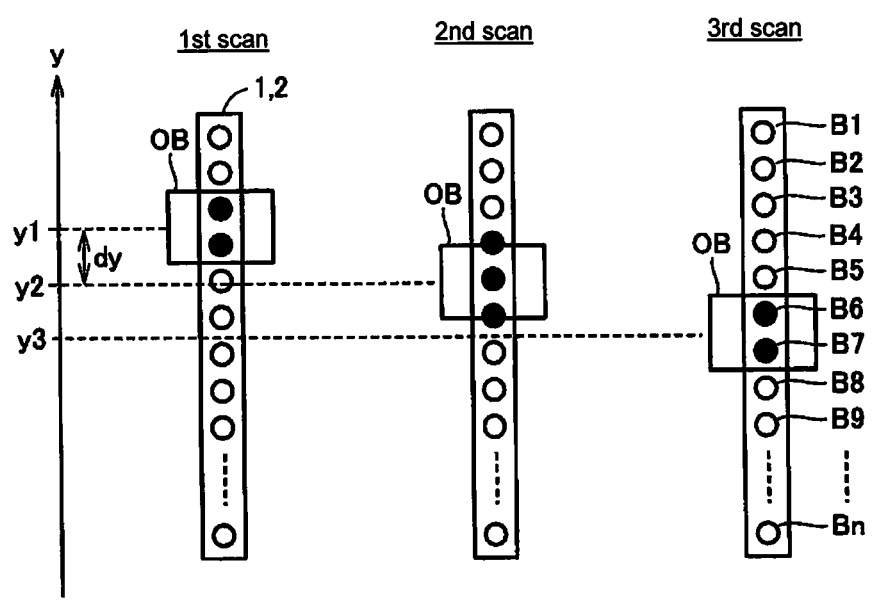
FIG. 19 is a diagram showing light interruption information obtained through a light emission and reception process corresponding to every scan during teaching.

FIG. 19 is a diagram showing light interruption information obtained in the emission and reception process corresponding to every scan during teaching for floating blanking. The light interruption information obtained by every scan indicates the position of the object OB in the light emission and reception process during scanning. As shown in FIG. 19, the y-axis direction is perpendicular to the optical axes. The position of the object OB (coordinate y1) in the first scan can be obtained from the optical axes B3 and B4 that are in an interrupted state. Similarly, the position of the object OB in the second scan and the third scan (coordinates y2 and y3) can be obtained from the optical axes that are in an interrupted state in each scan.

A difference between the position of the object OB (coordinate y1) in the first scan and the position of the object OB (coordinate y2) in the second scan corresponds to the distance by which the object OB moves in the time taken for one scan. The moving speed of the object OB can be calculated based on the moving distance of the object OB and the time taken for one scan.

Figure 20:
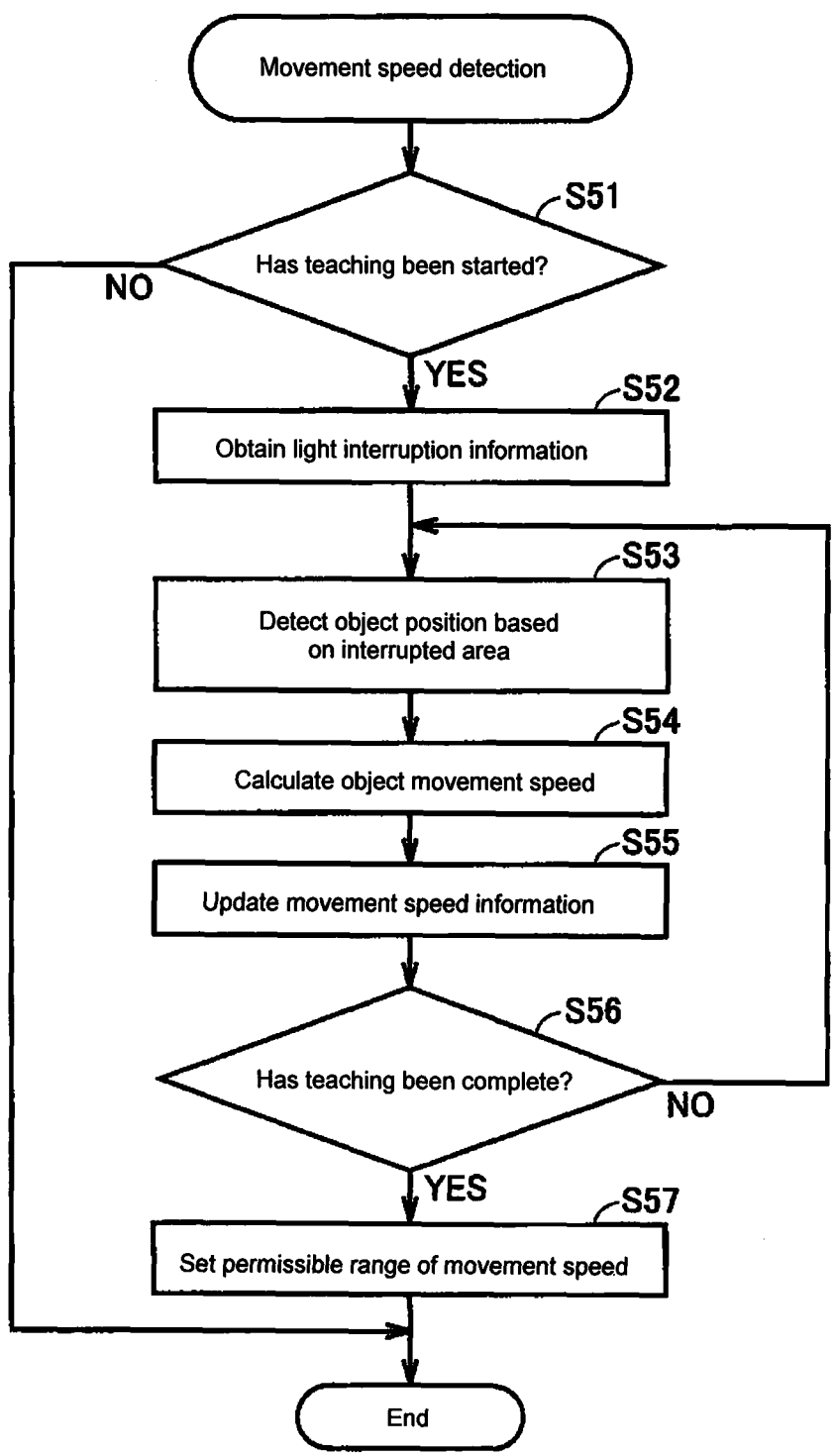
FIG. 20 is a flowchart showing an object moving speed detection process performed during teaching.

FIG. 20 is a flowchart showing an object moving speed detection process performed during teaching for floating blanking. Referring to FIG. 20, the teaching processing unit 80 first determines whether the teaching has been started (step S51). The determination as to whether the teaching has been started is performed by, for example, referring to a parameter that is input into the input unit 55 included in the personal computer 5 or the setting of the switch arranged on the emitter unit 1 or the receiver unit 2.

When determining that the teaching has been started in response to a command for switching to the teaching mode (YES in step S51), the teaching processing unit 80 obtains light interruption information every after the light emission and reception process corresponding to one scan (step S52).

When detecting the position of the object OB (y coordinate) (step S53) based on the obtained light interruption information, the teaching processing unit 80 calculates the moving distance of the object OB in the time taken for one scan based on the detected position of the object OB and the position of the object OB detected in the previous scan. The teaching processing unit 80 calculates the moving speed of the object OB based on the calculated moving distance of the object OB and the time taken for one scan (step S54). The teaching processing unit 80 updates the moving speed information to include the moving speed of the object OB in the current scan (step S55).

During teaching, the teaching processing unit 80 accumulates the moving speed information together with the light interruption information, the interrupted area information, and the interrupted optical axis number information. The teaching processing unit 80 may further provide the moving speed information accumulated in the storage unit to the user during teaching.

Subsequently, the teaching processing unit 80 determines whether the teaching has been complete (step S56). When determining that the teaching has not been complete (NO in step S56), the teaching processing unit continues the processing in steps S53 to S55. More specifically, the teaching processing unit 80 calculates the moving speed of the object OB every after the light emission and reception process corresponding to one scan, and accumulates every calculated moving speed of the object OB as the moving speed information.

When determining that the teaching has been complete (YES in step S56), the teaching processing unit 80 extracts the upper limit and the lower limit of the moving speed from the accumulated moving speed information. The teaching processing unit 80 sets the permissible range of the moving speed based on the upper and lower limits of the moving speed (step S57). The set permissible range of the moving speed is provided to the user by the information providing unit together with the floating activated area, the floating optical axis number, and the excluded optical axis number.

(7) Abnormal Object Movement Detection

The range of the moving speed of the object OB is set through the object moving speed detection process (6) described above. Using the set range, the teaching processing unit 80 performs a process for detecting an abnormal movement of the object OB after the operation mode is switched from the teaching mode to the detection mode during floating blanking. More specifically, the teaching processing unit 80 detects the moving speed of the object OB during floating blanking, and compares the detected moving speed with the permissible range. When the machine becomes uncontrollable in the detection mode and the object moves at a speed exceeding the permissible range, the teaching processing unit 80 can detect an abnormality in the machine and inform the user of the abnormality.

Figure 21:
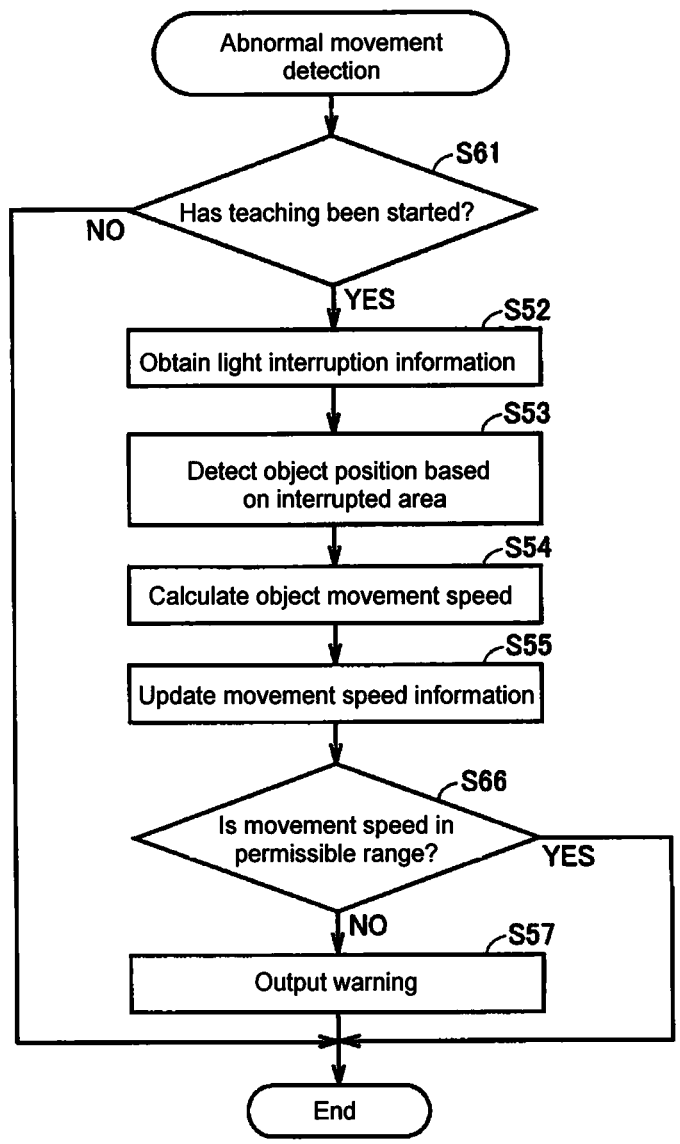
FIG. 21 is a flowchart showing an abnormal object movement detection process performed during floating blanking.

FIG. 21 is a flowchart showing an abnormal object movement detection process performed during floating blanking. Referring to FIG. 21, the teaching processing unit 80 first determines whether the detection mode has been started (step S61). The determination as to whether the detection mode has been started is performed by, for example, referring to a parameter that is input into the input unit 55 included in the personal computer 5 or the setting of the switch arranged on the emitter unit 1 or the receiver unit 2.

When determining that the detection mode has been started in response to a command for ending the teaching mode (YES in step S61), the teaching processing unit 80 detects the position of the object OB and the moving speed of the object OB, and updates the moving speed information based on the light interruption information obtained during floating blanking in steps S52 to S55 in the same manner as shown in FIG. 20.

The teaching processing unit 80 further compares the calculated moving speed of the object OB with the permissible range of the moving speed (step S66). When the moving speed of the object OB exceeds the permissible range (NO in step S66), the teaching processing unit 80 provides a warning to the user (step S67). The warning can be provided by, for example, blinking of light on the indicator lamps 10 and 20.

(8) Maximum Permissible Size Determination

The teaching processing unit 80 according to embodiments of the present invention can calculate the permissible size range of an object based on the setting values for floating blanking. When, for example, the floating optical axis number is 3 and the excluded optical axis number is 1 as shown in FIG. 9, the size of an object for which these setting values can be used is defined by the interrupted optical axis number of 2 to 3. The teaching processing unit

80 can provide the calculated size range of the object to the user through the screen display performed by the display unit 57 included in the personal computer 5.

(9) Setting Input Reception

The multi-optical axis photoelectric sensor system according to embodiments of the present invention further includes an input unit that receives settings input from the user. The input unit receives settings for conditions that are used by the teaching processing unit 80 to set values for floating blanking and blanking monitoring. More specifically, when teaching is performed, the user can select the setting values for floating blanking and blanking monitoring from either the setting values focusing on safety or the setting values focusing on productivity. To focus on safety during teaching for floating blanking, the floating optical axis number is set to, for example, a value obtained by adding a predetermined margin to the floating optical axis number calculated based on the interrupted optical axis number information. To focus on productivity, the excluded optical axis number is set to, for example, a value obtained by adding a predetermined margin to the excluded optical axis number calculated based on the interrupted optical axis number information. Adjusting the conditions for the setting values for floating blanking in this manner improves the convenience of the user.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST

1 emitter unit
2 receiver unit
3 dedicated code
4 communicator unit
5 personal computer
10, 20 indicator lamp
11 emitter element
12 drive circuit
13, 25 optical axis sequential selector circuit
14, 29 storage circuit
15 external power supply
16, 26 processor circuit
17, 27, 37 communication circuit
18, 28, 38 power supply
19, 32 display circuit
21 receiver element
22, 24 amplifier
23 switch
30 monitor circuit
31 output circuit
32 external connector terminal
34 communication converter
36 microcomputer
51 controller
53 storage unit
55 input unit
57 display unit
59 external storage unit
61 recording medium
100 multi-optical axis photoelectric sensor system
101 communication cable
102 branch connector
LC detection area
OB object
SNS multi-optical axis photoelectric sensor

The invention claimed is:

1. A multi-optical axis photoelectric sensor system, comprising:
   an emitter unit including a plurality of emitter elements that are aligned linearly;
   a receiver unit including a plurality of receiver elements that are arranged to face the respective emitter elements;
   a detection processing unit configured to determine, in a detection area including a plurality of optical axes formed between the plurality of emitter elements and the plurality of receiver elements, whether each of the optical axes is in an interrupted state after optical axis selection corresponding to one scan, and output a detection signal based on a result of the determination; and
   a teaching processing unit configured to: determine a permissible range in which one or more of the optical axes is in an interrupted state; and perform processing to display a warning when a setting value is outside the permissible range,
   wherein when at least one of the plurality of optical axes is constantly interrupted by an object movable within the detection area, the detection processing unit outputs the detection signal upon determining that the number of optical axes in an interrupted state is greater than a preset maximum optical axis number, and also outputs the detection signal upon determining that the number of optical axes in an interrupted state is smaller than a preset minimum optical axis number, and
   wherein the teaching processing unit obtains information indicating the permissible range when a teaching processing has started and determines the permissible range based on the movable range of the object in the detection area.

2. The multi-optical axis photoelectric sensor system according to claim 1, wherein
   the teaching processing unit is further configured to set the maximum optical axis number and the minimum optical axis number through teaching performed using the object, and
   the teaching processing unit obtains the number of optical axes interrupted by the object after optical axis selection corresponding to one scan, and sets the maximum optical axis number and the minimum optical axis number based on a result of comparison between the numbers of interrupted optical axes obtained in the respective scans.

3. The multi-optical axis photoelectric sensor system according to claim 2, wherein
   the teaching processing unit sets the minimum optical axis number as a smallest value of the numbers of interrupted optical axes obtained in the respective scans or as a value obtained by subtracting a predetermined optical axis number from the smallest value.

4. The multi-optical axis photoelectric sensor system according to claim 2, wherein the teaching processing unit sets the maximum optical axis number as a largest value of the numbers of interrupted optical axes obtained in the respective scans or as a value obtained by adding a predetermined optical axis number to the largest value.

5. The multi-optical axis photoelectric sensor system according to claim 2, wherein the teaching processing unit sets the maximum optical axis number as a value obtained by adding a predetermined optical axis number to a smallest value of the numbers of interrupted optical axes obtained in the respective scans.

6. The multi-optical axis photoelectric sensor system according to claim 2, wherein the teaching processing unit sets the minimum optical axis number as a value obtained by subtracting a predetermined optical axis number from a largest value of the numbers of interrupted optical axes obtained in the respective scans.

7. The multi-optical axis photoelectric sensor system according to claim 2, wherein the teaching processing unit is arranged in at least one of the emitter unit and the receiver unit.

8. The multi-optical axis photoelectric sensor system according to claim 1, wherein the detection processing unit is arranged in at least one of the emitter unit and the receiver unit.

\* \* \* \* \*